(12) United States Patent
Bamborough et al.

(10) Patent No.: US 7,238,732 B2
(45) Date of Patent: *Jul. 3, 2007

(54) RADIATION-CURABLE ADHESIVE COMPOSITIONS

(75) Inventors: Derek William Bamborough, Nieuw en Sint Joosland (NL); Elisabeth Eduarda Catharina Geertruida Gielens, Kwadendamme (NL); Clazina Cornelia Adriana Adriaanse, Heinkenszand (NL); Peter Versluijs, Middelburg (NL); Michel Hendrikus Theelen, Westkapelle (NL)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/780,996

(22) Filed: Feb. 18, 2004

(65) Prior Publication Data

US 2005/0182150 A1 Aug. 18, 2005

(51) Int. Cl.
C08F 2/46 (2006.01)
C08F 299/02 (2006.01)
C08F 299/06 (2006.01)
C08J 3/28 (2006.01)

(52) U.S. Cl. ............... 522/106; 522/104; 522/107; 522/113; 522/114; 522/120; 522/125; 522/134; 522/135; 522/144; 522/109; 522/110; 522/111; 522/90; 522/95; 522/96; 428/355 R; 428/355 AC; 428/355 EN; 427/207.1

(58) Field of Classification Search ........... 522/109, 522/110, 111, 113, 90, 95, 96, 104, 106, 107, 522/114, 120, 125, 134, 135, 144; 428/355 R, 428/355 AC, 355 EN; 427/207.1
See application file for complete search history.

(56) References Cited

U.S. PATENT DOCUMENTS

| | | | |
|---|---|---|---|
| 3,203,935 A | 8/1965 | Miranda et al. | |
| 3,753,958 A | 8/1973 | Wingler et al. | |
| 3,991,136 A | 11/1976 | Dalton et al. | |
| 4,077,926 A | 3/1978 | Sanderson et al. | |
| 4,137,389 A | 1/1979 | Wingler et al. | |
| 4,243,500 A | 1/1981 | Glennon | |
| 4,303,485 A | 12/1981 | Levens | |
| 4,305,854 A | 12/1981 | Rowe | |
| 4,311,759 A | 1/1982 | Glennon | |
| 4,329,384 A | 5/1982 | Vesley et al. | |
| 4,330,590 A | 5/1982 | Vesley | |
| 4,361,680 A | 11/1982 | Borg et al. | |
| 4,391,687 A | 7/1983 | Vesley | |
| 4,404,338 A | 9/1983 | De Toffol et al. | |
| 4,483,951 A | 11/1984 | Brenner | |
| 4,529,787 A | 7/1985 | Schmidt et al. | |
| 4,533,566 A | 8/1985 | Evans et al. | |
| 4,537,734 A | 8/1985 | Morganstern | |
| 4,540,739 A | 9/1985 | Midgley | |
| 4,587,289 A | 5/1986 | Comert et al. | |
| 4,695,621 A | 9/1987 | Allada | |
| 4,912,169 A | 3/1990 | Whitmire et al. | |
| 4,929,717 A | 5/1990 | Chmelir | |
| 4,948,825 A | 8/1990 | Sasaki | |
| 4,952,435 A | 8/1990 | Okita | |
| 4,968,373 A | 11/1990 | Chevalier et al. | |
| 4,968,559 A | 11/1990 | Kuroda et al. | |
| 4,968,740 A | 11/1990 | Makati et al. | |
| 5,028,484 A * | 7/1991 | Martin et al. ............... 428/352 |
| 5,100,963 A | 3/1992 | Lin | |
| 5,104,921 A | 4/1992 | Erickson et al. | |
| 5,112,882 A | 5/1992 | Babu et al. | |
| 5,115,008 A | 5/1992 | Sasaki | |
| 5,227,213 A | 7/1993 | Komori et al. | |
| 5,236,991 A | 8/1993 | Makati et al. | |
| 5,242,980 A | 9/1993 | Tse | |
| 5,244,962 A | 9/1993 | Plamthottam et al. | |
| 5,338,810 A | 8/1994 | Shimomura et al. | |
| 5,373,066 A | 12/1994 | Rebre et al. | |
| 5,534,575 A | 7/1996 | Foster et al. | |
| 5,695,837 A | 12/1997 | Everaerts et al. | |
| 5,747,551 A | 5/1998 | Lewandowski et al. | |
| 5,789,511 A | 8/1998 | Kimpton et al. | |
| 5,837,749 A | 11/1998 | Erickson et al. | |
| 5,852,124 A | 12/1998 | Wang et al. | |
| 5,969,025 A | 10/1999 | Corzani | |
| 6,140,400 A | 10/2000 | Figge et al. | |

(Continued)

FOREIGN PATENT DOCUMENTS

CA   1 068 047 A   12/1979

(Continued)

OTHER PUBLICATIONS

Office Action dated Mar. 9, 2006 for Related Case, U.S. Appl. No. 10/780,989.

(Continued)

*Primary Examiner*—Sanza L. McClendon
(74) *Attorney, Agent, or Firm*—Polly C. Owen; Bernard J. Graves, Jr.

(57) ABSTRACT

A radiation-curable adhesive composition comprising at least one tackifier resin and at least one radiation-curable composition is provided wherein the tackifier resin comprises monomer repeating units from at least one aromatic monomer and at least one acrylate monomer. Processes to produce the radiation-curable adhesive composition as well as articles comprising the radiation-curable adhesive compositions are also provided.

60 Claims, 17 Drawing Sheets

U.S. PATENT DOCUMENTS

| | | | |
|---|---|---|---|
| 6,160,059 | A | 12/2000 | Roth et al. |
| 6,210,517 | B1 | 4/2001 | Eadara et al. |
| 6,214,925 | B1 | 4/2001 | Schuler et al. |
| 6,339,112 | B1 | 1/2002 | Kauffman et al. |
| 6,410,683 | B1 | 6/2002 | Craig |
| 6,502,621 | B2 | 1/2003 | Sonnenberg et al. |
| 6,552,141 | B1 | 4/2003 | Chmelir et al. |
| 6,783,850 | B2 * | 8/2004 | Takizawa et al. ..... 428/355 AC |
| 2003/0008140 | A1 | 1/2003 | Takizawa et al. |
| 2003/0027961 | A1 | 2/2003 | Chmelier et al. |
| 2003/0181540 | A1 | 9/2003 | Quellet et al. |

FOREIGN PATENT DOCUMENTS

| | | |
|---|---|---|
| DE | 100 63 018 A1 | 7/2002 |
| EP | 0 050 261 A1 | 4/1982 |
| EP | 0 158 524 A2 | 10/1985 |
| EP | 0 197 460 A2 | 10/1986 |
| EP | 0 197 845 B1 | 1/1989 |
| EP | 0 303 430 A1 | 2/1989 |
| EP | 0 342 808 A1 | 11/1989 |
| EP | 0 354 521 A2 | 2/1990 |
| EP | 0 357 204 A2 | 3/1990 |
| EP | 0 416 921 A1 | 3/1991 |
| EP | 0 474 412 A2 | 3/1992 |
| EP | 0 476 168 A1 | 3/1992 |
| EP | 0 604 709 A2 | 7/1994 |
| EP | 0 620 257 A2 | 10/1994 |
| EP | 0 699 800 A2 | 3/1996 |
| EP | 0 710 708 A2 | 5/1996 |
| EP | 0 963 760 A1 | 12/1999 |
| EP | 1 130 070 | 9/2001 |
| EP | 1 180 533 A1 | 2/2002 |
| EP | 1 193 289 A1 | 4/2002 |
| EP | 1 256 614 A2 | 11/2002 |
| EP | 1 258 515 A2 | 11/2002 |
| GB | 1 448 937 | 9/1976 |
| JP | 54003136 | 6/1977 |
| JP | 56149481 A | 11/1981 |
| JP | 60-144303 | 7/1985 |
| JP | 8-27450 A | 1/1996 |
| JP | 8-333425 A | 12/1996 |
| JP | 09-059462 | 3/1997 |
| JP | 2003-040935 | 2/2003 |
| WO | WO 93/11184 A1 | 6/1993 |
| WO | WO 93/24547 A1 | 12/1993 |
| WO | WO 94/13750 A1 | 6/1994 |
| WO | WO 95/13331 A1 | 5/1995 |
| WO | WO 96/33246 A1 | 10/1996 |
| WO | WO 96/35725 A1 | 11/1996 |
| WO | WO 97/26307 A1 | 7/1997 |
| WO | WO 97/29140 A1 | 8/1997 |
| WO | WO 97/31076 A1 | 8/1997 |
| WO | WO 98/23699 A1 | 6/1998 |
| WO | WO 99/62685 A1 | 12/1999 |
| WO | WO 00/22062 A1 | 4/2000 |
| WO | WO 00/27942 A1 | 5/2000 |
| WO | WO 00/39189 A1 | 7/2000 |
| WO | WO 01/16244 A1 | 3/2001 |
| WO | WO 01/55276 A1 | 8/2001 |
| WO | WO 01/81495 A2 | 11/2001 |
| WO | WO 02/053602 A1 | 7/2002 |
| WO | WO 03/011959 A1 | 2/2003 |

OTHER PUBLICATIONS

Office Action dated Sep. 22, 2006 for Related Case, U.S. Appl. No. 10/780,987.

Notification of Transmittal of the International Search Report and the Written Opinion of the International Searching Authority, or the Declaration date of mailing May 23, 2005.

* cited by examiner

RADIATION-CURABLE ADHESIVE COMPOSITIONS

FIELD OF THE INVENTION

This invention is related to the field of radiation-curable adhesive compositions. More specifically, this invention is related to the field of radiation-curable adhesive compositions comprising at least one tackifier resin and at least one radiation-curable composition; wherein the tackifier resin comprises monomer repeating units from at least one aromatic monomer and at least one acrylate monomer. This invention is also related to processes to produce the radiation-curable adhesive composition and to articles comprising the radiation-curable adhesive composition.

BACKGROUND OF THE INVENTION

Acrylic polymers are widely used as the basis for adhesive materials. They are manufactured and applied as solvent-based, water-based or hot melt-based adhesive materials. To maintain low viscosities for ease of application, lower molecular weight acrylic polymers or acrylic monomers are commonly supplied as an uncured adhesive material and cross-linked after being applied thereby increasing the molecular weight and cohesive strength of the final adhesive composition. These post treatments are used to control the final adhesive performance.

Most cross-linkable acrylic adhesives are used without other additives, but in some cases, tackifier resins are used to improve adhesive performance. Particularly, there is one form of cross-linking mechanism used, high-energy radiation in the Ultra Violet (UV) and Electron Beam (EB) wavelength regions, where the use of tackifier resins is beneficial to improve adhesion. Commercially available tackifiers require specific properties, e.g. polarity or aromaticity, to be suitable for modification of acrylic polymers. Some examples of these commercially available tackifiers are rosins, rosin esters, hydrogenated rosin esters, pure monomer resins, styrene-based resins, and hydrogenated hydrocarbon resins. The commercial range of suitable tackifier resins is however limited. This absence of suitable tackifier resins that enable optimized adhesive performance as measured by tack, peel and cohesion have severely hampered the commercial growth of UV hot melt acrylic adhesive systems.

For example, the adhesive industry has a perception that rosin-based materials can cause skin sensitization. In particular, for the medical pressure sensitive adhesive markets, there is an unmet need for tackifier resins that are not skin sensitizers, have no cytotoxicity, and are hypoallergenic.

More specifically, new tackifier resins are also needed to improve the performance of UV curable hot-melt acrylic copolymers under the trade name, acResin®, produced by BASF. AcResin® acrylic copolymer is an environmentally friendly, solvent-free alternative to solvent-based acrylic pressure sensitive adhesives. Two of the three commercially available acResin® acrylic copolymers were developed to be formulated with suitable tackifier resins to obtain the correct adhesive properties for various pressure-sensitive adhesive end-uses. Currently, the acResin® UV technology platform lacks degree of freedom to enable the many adhesive formulators to design tailor-made solutions for specific end uses. With 3 acResin® UV curable, hold-metal acrylic copolymers and a limited choice of suitable, commercially available tackifier resins, there is a need in the adhesive industry to design novel tackifier resin types for optimum compatibility with acResin® UV technology.

Therefore, there is a commercial need for compatible tackifier resins for radiation-curable compositions in the adhesive industry to produce radiation-curable adhesives.

BRIEF SUMMARY OF THE INVENTION

Applicants have developed tackifier resins for tackification of radiation-curable compositions, in particular, acResin® UV acrylic copolymers to produce radiation-curable adhesive compositions. These tackifier resins have at least one of the properties listed below:
1) good compatibility with radiation-curable compositions, such as, acResin® UV acrylic copolymer as shown by a compatibility test using a heat bank (see examples for details of test method);
2) low UV radiation absorption at the curing wave length;
3) light colored (water-white), resulting in light colored hot melts;
4) non-gel forming upon heating;
5) stable at higher temperatures;
6) very low levels of residual monomers, which results in desirable fogging behavior;
7) sufficient moisture vapor transmission rate (breathability) in the radiation-curable adhesive composition so as to be classified as breathable; and
8) no significant skin sensitization properties.

In some embodiments of this invention, the tackifier resin may have all of these properties.

In accordance with one embodiment of this invention, a radiation-curable adhesive composition is provided comprising at least one tackifier resin and at least one radiation-curable composition wherein the tackifier resin comprises monomer repeating units from at least one aromatic monomer and at least one acrylate monomer; and wherein the radiation-curable composition can be cured by exposure to radiation.

In accordance with another embodiment of this invention, a radiation-cured adhesive composition is provided comprising at least one tackifier resin, at least one radiation-curable composition, and at least one substrate; wherein the tackifier resin comprises monomer repeating units from at least one aromatic monomer and at least one acrylate monomer; and wherein the radiation-curable composition is exposed to radiation.

In accordance with another embodiment of this invention, a process is provided to produce the radiation-curable adhesive composition. The process comprises providing at least one tackifier resin and at least one radiation-curable composition; wherein the tackifier resin comprises monomer repeating units from at least one aromatic monomer and at least one acrylate monomer; wherein the radiation-curable composition can be cured by exposure to radiation.

In accordance with still another embodiment of this invention, a process is provided to produce the radiation-cured adhesive composition. The process comprises: 1) providing at least one tackifier resin and at least one radiation-curable composition to produce a radiation-curable adhesive composition, 2) contacting the radiation-curable composition with at least one substrate, and 3) exposing the radiation-curable adhesive composition to radiation to produce the radiation-cured adhesive composition; wherein the tackifier resin comprises monomer repeating units from at least one aromatic monomer and at least one acrylate monomer.

In accordance with yet another embodiment of this invention, an article comprising the radiation-curable adhesive composition is provided.

In accordance with still another embodiment of this invention, an article comprising the radiation-cured adhesive composition is provided.

DETAILED DESCRIPTION

Figure 1:
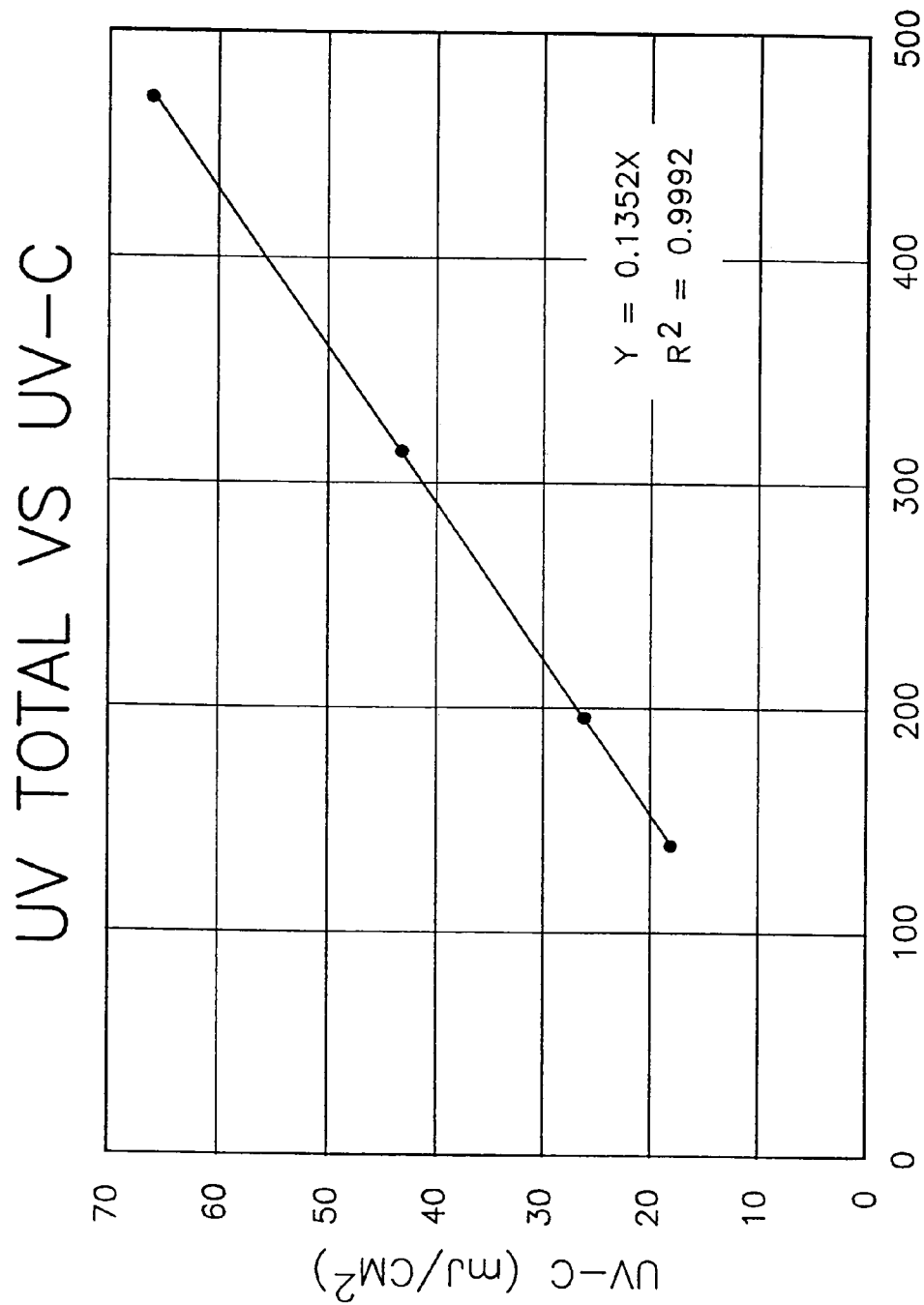
FIG. 1 shows the relationship of Total UV to UV-C dose.

A radiation-curable adhesive composition comprising at least one tackifier resin and at least one radiation-curable composition is provided. The tackifier resin comprises monomer repeating units from at least one aromatic monomer and at least one acrylate monomer. The radiation-curable composition can be cured by exposure to radiation.

The aromatic monomer can be any aromatic monomer known in the art capable of polymerizing with at least one acrylate monomer. The term "aromatic monomer" means a monomer containing at least one group of unsaturated cyclic hydrocarbons containing one or more rings. Examples of aromatic monomers include, but are not limited to, olefinic substituted aromatics, such as, styrene, alpha-methyl styrene, vinyl toluene, indene, methylindenes, divinylbenzene, dicyclopentadiene, and methyl-dicyclopentadiene. Most preferably, the aromatic monomer is styrene. The aromatic monomer can be added to a reactor zone in the polymerization process as a single type of monomer or a mixture and can be added in varying amounts and at varying addition times during the polymerization.

The acrylate monomer is any acrylate monomer known in the art capable of polymerizing with the aromatic monomer. The acrylate monomer can be added to a reactor zone in the polymerization process as a single type of monomer or as a mixture and can be added in varying amounts and at varying addition times during the polymerization.

In one embodiment, the acrylate monomer has the general formula:

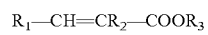

$$R_1\text{---}CH\text{=\!=}CR_2\text{---}COOR_3$$

wherein $R_1$ is selected from the group consisting of hydrogen, aliphatic groups, and aromatic groups; wherein $R_2$ is selected from the group consisting of hydrogen, aliphatic groups, and aromatic groups; and wherein $R_3$ is selected from the group consisting of hydrogen, aliphatic groups, aromatic groups. The term "aliphatic" is defined as a straight or branched chain arrangement of constituent carbon atoms and includes, but is not limited to, alkanes, alkenes, alkadienes, and alkynes. The aliphatic groups can contain functional groups, such as, but not limited to, hydroxyl, cycloaliphatic, acid, epoxide, amide, acrylonitril and acrylate. Preferably, the aliphatic group has 1 to about 20 carbon atoms, more preferably, from 1 to 12. The term "aromatic group" means at least one group of unsaturated cyclic hydrocarbons containing one or more rings. Aromatic groups can be selected from the group consisting of both unsubstituted and substituted aromatic groups having constituents with up to about 6 carbon atoms. Preferably, the aromatic group has about 6 to about 20 carbon atoms. The aromatic groups can contain functional groups, such as, but not limited to, hydroxyl, cycloaliphatic, acid, epoxide, amide, acrylonitril and acrylate. In some cases, these functional groups can lead to an acrylate monomer that has more than one reactive site for polymerization or other reactions.

In one embodiment, both $R_1$ and $R_2$ of the acrylate monomer are hydrogen. When the acrylate monomer is a methacrylic compound, $R_2$ is a $CH_3$ group.

For acid functionality monomers, $R_3$ is often hydrogen, such as, acrylic acid and methacrylic acid. The acid functionality monomers can also be difunctional components such as, for example, maleic acid, fumaric acid or can be the anhydride forms of these components.

In another embodiment, the functional group is often found in the $R_3$ group. Suitable examples are hydroxyethylacrylate, glycidylmethacrylate, and 1,3-butanediol dimethylacrylate.

Examples of acrylate monomers include, but are not limited to, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl (meth)acrylate, iso-nonyl(meth)acrylate, decyl(meth)acrylate, isodecyl acrylate, isodecyl methacrylate, dodecyl (meth)acrylate, isobornyl(meth)acrylate, lauryl methacrylate, lauryl acrylate, tridecyl acrylate, tridecyl methacrylate, stearyl acrylate, stearyl methacrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetoxypropyl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy) ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400)acrylate, polypropyleneglycol(400)methacrylate, benzyl acrylate, benzyl methacrylate, sodium 1-allyloxy-2-hydroylpropyl sulfonate, acrylonitrile, and the like.

Acrylate monomers are described in "The Brandon Worldwide Monomer Reference Guide and Sourcebook" Second Edition, 1992, Brandon Associates, Merrimack, N.H.; and in "Polymers and Monomers", the 1996–1997 Catalog from Polyscience, Inc., Warrington, Pa.

Two or more of the acrylate monomers may be used in combination. Preferably, the acrylate monomer has up to about 20 carbon atoms, such as, but not limited to, acrylic acid, 2-ethylhexyl acrylate, methyl methacrylate, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl(meth)acrylate, hydroxyethyl methacrylate, hydroxyethyl acrylate, allyl methacrylate, cyclohexyl methacrylate, cyclohexyl acrylate, n-hexyl acrylate, n-hexyl methacrylate, isobornyl acrylate, isobornyl methacrylate, and the like. Most preferably, the acrylate monomers are acrylic acid and 2-ethylhexyl acrylate.

Functionality can be built in to the tackifier resin by choosing an acrylate monomer containing at least one functional group. The functional group can be selected from hydroxy, cycloaliphatic, acid, epoxide, amide, acrylonitril and acrylate groups. Most preferable, the acrylate monomer contains acid groups or hydroxyl groups. This functionality can lead to even better cohesion in the radiation-curable adhesive composition than in the radiation-curable composition alone as determined by the Shear Adhesion Failure Test (SAFT), however, the tackifier resin can be less heat stable due to trans-esterfication reactions. Other specific functional groups can be choosen to improve MVTR, fogging, and adhesion.

The tackifier resin can be produced by any process known in the art. In one embodiment, the tackifier resin can be produced by a radical catalyzed polymerization mechanism:

Decomposition: $I \text{ - - - } 2*R\bullet$
Initiation: $R\bullet + M \text{ - - - } M_1\bullet$
Propagation: $M_i\bullet + M \text{ - - - } M_{i+1}\bullet$
Termination: $M_i\bullet + M_j\bullet \text{ - - - } M_i + M_j$ wherein I represents an initiator; R• represents a radical; and M represents a monomer.

Any polymerization initiator known in the art for radical catalyzed polymerization can be utilized. Initiators are typically chosen based on the desired molecular weight of the tackifier resin and the polymerization temperature. The effect of decomposition products of the initiator on the odor of the tackifier resin can also be a factor. Suitable initiators can be chosen from all kinds of commercially available organic peroxides, such as, but not limited to, diacyl peroxides, dialkylperoxidicarbonates, tert-alkyl peroxyesters, di-tert-alkyl peroxides, tert-alkyl hydroperoxides, ketone peroxides, and mixtures thereof. Preferably, the initiator is selected from the group consisting of di-tert-butyl peroxide, dicumyl peroxide, and di-amyl peroxide.

The radical catalyzed polymerization can occur in a reactor zone in the presence of at least one solvent. Processes without solvent may also be utilized. Generally, the reactor zone comprises at least one reactor. The solvent can be any solvent that is known in the art to be utilized in radical catalyzed polymerizations. Examples of solvents include, but are not limited to, xylene, toluene, ethylbenzene, trimethylbenzene, and mixtures thereof. Preferably, the solvent is xylene or a mixture of the isomers of methyethylbenzene, trimethylbenzene, ethyl-dimethylbenzene, propylmethylbenzene and tetramethylbenzene. Most preferably, the solvent is xylene.

Radical catalyzed polymerization to produce the tackifier resins can be batch, fed batch or continuous. Reaction temperatures for the radical catalyzed polymerization can be from 0 to about 250° C., preferably from about 100° C. to about 200° C., and most preferably from 150° C. to 160° C. Initiator levels can be from about 0.1% by weight to about 6% by weight based on the weight of the monomer feed, preferably the amount of initiator can range from 0.1% to 3%.

In one embodiment, a process to produce a tackifier resin is provided wherein the tackifier resin has a low residual monomer concentration. Residual monomer is defined as unreacted monomer or monomers contained in the tackifier resin. The process comprises contacting a tackifier resin product stream with at least one carrier at a temperature sufficient to remove a portion of at least one residual monomer to produce the tackifier resin having a low residual monomer concentration. The tackifier resin product stream comprises tackifier resin and solvent. A portion of the residual solvent can also be removed from the tackifier resin product stream. The tackifier resin and solvent were previously discussed in this disclosure.

This tackifier resin having a low residual monomer concentration is particularly useful in adhesives for medical applications since it can have a clear color. A low residual monomer concentration in the tackifier resin can also reduce the skin sensitivity of the tackifier resin. It can also give much better fogging behavior of the radiation-curable adhesive composition over radiation-curable adhesive compositions containing tackifier resins without low residual monomer concentrations.

The amount of residual monomer in the tackifier resin depends on the use of the radiation-curable adhesive compositions. In one embodiment, a tackifier resin having a low residual monomer concentration is defined as a tackifier resin that does not significantly decrease the MVTR of the radiation-curable adhesive composition. A tackifier resin does not significantly decrease the MVTR of the radiation-curable adhesive composition if the MVTR is not decreased by more than 25%, preferably 10% over the radiation-curable composition without the tackifier resin. Preferably, the MVTR of the radiation-curable adhesive composition is the same or increased over the radiation-curable composition alone. For example, the MVTR of the radiation-curable adhesive composition can range from about 200 to about 3000, preferably from 500 to 1500.

The contacting of the tackifier resin product stream with the carrier to remove a portion of the residual monomer can be conducted by any means known in the art. Examples of carriers include, but are not limited to, steam, nitrogen and ethane. Preferably, the carrier is stream. The temperature and pressure of the carrier is that which is sufficient to remove a portion of the residual monomer to obtain the desired residual monomer concentration of the tackifier resin or desired MVTR of the radiation-curable adhesive composition. Depending on the application, it may also be desirous that the residual monomer concentration of the tackifier resin is such that it does not increase fogging of the radiation-curable adhesive composition or cause any significant level of skin sensitivity. Preferably, the residual monomer concentration of the tackifier resin is less than about 600 ppm by weight based on the weight of the tackifier resin, more preferably less than about 300 ppm by weight, and most preferably, less than 250 ppm by weight.

In another embodiment, the residual monomer concentration of the tackifier resin is less than about 200 ppm aromatic monomer based on the weight of the tackifier resin and less than about 400 ppm acrylic monomer, preferably less than about 100 ppm by weight aromatic monomer and less than about 200 ppm by weight acrylic monomer, and most preferably, less than 100 ppm by weight aromatic monomer and less than 150 ppm by weight acrylic monomer.

In yet another embodiment of this invention, the residual solvent concentration in the tackifier resin is less than about 500 ppm by weight based on the weight of the tackifier resin, preferably less than about 200 ppm by weight, and most preferably, less than 50 ppm by weight.

The contacting of the tackifier resin product stream with the carrier can occur at any temperature and pressure sufficient to obtain the desired residual monomer concentration in the tackifier resin. Preferably, the contacting can occur at a temperature in the range of about 150° C. to about 250° C., more preferably, from 160° C. to 220° C. Preferably, the contacting of the tackifier resin product stream with the carrier occurs at a pressure in the range of about 10 mbar to about 1000 mbar, preferably from 20 mbar to 200 mbar.

In another embodiment of this invention, a process to produce the tackifier resin is provided. The process comprises:

a) providing at least one aromatic monomer, at least one acrylate monomer, and optionally at least one solvent to a reactor zone to produce a reaction mixture;

b) polymerizing the reaction mixture in the presence of at least one initiator to produce a tackifier resin product stream; and c) contacting the tackifier resin product stream with a carrier to remove a portion of at least one residual monomer from the tackifier resin product stream to yield the tackifier resin. The process of contacting the tackifier resin product stream with the carrier has been previously discussed in this disclosure.

In another embodiment of this invention, a process to produce the tackifier resin having a low residual monomer concentration is provided. The process comprises:

a) providing at least one aromatic monomer, at least one acrylate monomer, and optionally at least one solvent to a reactor zone to produce a reaction mixture;

b) polymerizing the reaction mixture in the presence of at least one initiator to produce a tackifier resin product stream;

c) heating the tackifier resin product stream at a temperature sufficient to remove a portion of at least one residual monomer from the tackifier resin product stream; and d) contacting the tackifier resin product stream with at least one carrier to further remove a portion of the residual monomer to produce the tackifier resin. Preferably, the residual monomer concentration of the tackifier resin is less than about 600 ppm by weight based on the weight of the tackifier resin. The residual monomer concentration and residual solvent concentration can vary and were discussed previously in this disclosure.

The heating of the tackifier resin product stream can be conducted by any method known in the art. For example, the tackifier resin product stream can be heated while in the reactor vessel or it can be removed to other processing equipment. The heating is conducted at a temperature and pressure sufficient to remove a portion of at least one residual monomer. The temperature however should not be too high to cause color deterioration of the tackifier resin. The residual monomer can be removed by heating the tackifier resin product stream to a temperature ranging from about 150° C. to about 250° C., preferably 160° C. to 220° C. The pressure can vary from about 10 mbar to about 1000 mbar, preferably from 20 mbar to 200 mbar. Generally, the portion removed can range from about 1% by weight to about 200% by weight based on the weight of the tackifier resin. Preferably, the portion removed can range from 50% by weight to 150% by weight. The duration of the heating varies depending on the amount of tackifier resin product stream to be handled. For example, the duration can range from about 0.5 hours to about 8 hours.

The contacting of the tackifier resin product stream with a carrier was previously described in this disclosure.

In another embodiment, a tackifier resin having a low residual monomer concentrations is produced by a process comprising:

a) providing at least one aromatic monomer, at least one acrylate monomer, and optionally at least one solvent to a reactor zone to produce a reaction mixture;

b) polymerizing the reaction mixture in the presence of at least one initiator to produce a tackifier resin product stream;

c) heating the tackifier resin product stream at a temperature in a range of about 150° C. to about 250° C. to remove a portion of the residual monomer from the tackifier resin product stream; and d) contacting the tackifier resin product stream with a carrier to further remove a portion of the residual monomers to yield the tackifier resin having residual monomer concentrations of less than about 200 ppm of aromatic monomer and 400 ppm of acrylate monomer. The residual monomer level and residual solvent level can vary as discussed previously in this disclosure.

In yet another embodiment of the invention, the tackifer resin having a low residual monomer concentration is produced by a processs comprising:

a) contacting at least one aromatic monomer, at least one acrylate monomer, and at least one initiator to produce a monomer-initiator stream;

b) routing the monomer-initiator stream to a reaction zone optionally containing solvent at a temperature in the range of about 100° C. to about 250° C.;

c) polymerizing the monomer-initiator feed stream at polymerization conditions to produce a tackifier resin product stream;

d) optionally, providing an additional amount of initiator to the reaction zone;

e) heating the tackifier resin product stream at a temperature in a range of about 150° C. to about 250° C. and at a pressure of about 10 mbar to about 1000 mbar to remove a portion of the residual monomers from the tackifier resin product stream; and f) contacting the tackifier resin product stream with steam at a temperature of about 150° C. to about 250° C. and at a pressure of about 10 mbar to about 1000 mbar to further remove residual monomers from the tackifier resin product stream to yield the tackifier resin having residual monomer concentrations of less than 200 ppm by weight of aromatic monomer based on the weight of the tackifier resin and 400 ppm of acrylate monomer based on the weight of the tackifier resin. The tackifier resin can also have a residual solvent concentration of less than about 500 ppm.

By careful choice of the type of aromatic monomer and acrylic monomer, it is possible to control and fine-tune the properties of the radiation-curable adhesive composition for specific applications. Possible variations in the tackifier resin polymerization process are aromatic monomer type, acrylate monomer type, functionality in the form of acid or hydroxyl groups in the acrylate monomer, different process conditions, which all result in different softening points and molecular weights of the tackifier resin.

The amount of aromatic monomer repeating units in the tackifier resin can range from 0 to 100% based on the total amount of monomer repeating units in the tackifier resin, preferably from about 20% to about 70%, and most preferably from 25% to 65%. The amount of acrylate monomer repeating units in the tackifier resin can range from 0 to 100%, preferably from about 30% to about 80%, and most preferably, from 35% to 75% based on the total amount of monomer repeating units in the tackifier resin.

The tackifier resin can have a R&B softening point ranging from being a liquid at room temperature to about 180° C., preferably from about 50° C. to about 150° C., and most preferably, from 75° C. to 120° C. The acid number of the tackifier resin can range from about 0 to about 300 mg KOH/g resin, preferably from about 0 mg KOH/g resin to about 200 mg KOH/g resin, and most preferably from 5 to 150 mg KOH/g resin. The hydroxyl number can vary from about 0 to about 300, preferably from 0 to 200. The MMAP cloud point of the tackifier resin is typically less than 50° C., preferably the MMAP ranges from about −20° C. to about 30° C., and most preferably from −10° C. to 20° C.

The number average molecular weight (Mn) of the tackifier resin can range from about 1,500 to about 7,000 daltons, preferably from about 1,600 to about 4,500, and most preferably from 2,000 to 4,000. The weight average molecular weight (Mw) of the tackifier resin can range from about 2,000 to about 25,000 daltons, preferably from about 2,500 to about 12,000 and most preferably from 3,000 to 10,000. The z-average molecular weight (Mz) of the tackifier resin can range from about 3,000 to about 75,000 daltons, preferably from about 4,500 to about 30,000, and most preferably 5,000 to 20,000.

In one embodiment of this invention, the Gardner color of the tackifier resin generally is lower than 5, preferably is lower than 2, and most preferably is lower than 1. When the radiation-curable adhesive composition is used in medical applications, the Gardner color of the tackifier resin is generally lower than 2, and preferably is lower than 1. Light colored tackifier resins are often required for certain applications, especially in the medical adhesive field.

When the radiation-curable adhesive composition is used in medical applications, the residual monomer concentrations in the tackifier resin is typically less than about 200 ppm by weight aromatic monomer based on the weight of the tackifier resin and less than about 400 ppm by weight acrylic monomer based on the weight of the tackifier resin. Preferably, the amount of residual aromatic monomer is less than about 100 ppm by weight, and the amount of residual acrylic monomer is less than about 200 ppm by weight based on the weight of the tackifier resin. Most preferably, the amount of residual aromatic monomer is less than 100 ppm by weight based on the weight of the tackifier resin, and the amount of residual acrylic monomer is less than 150 ppm based on the weight of the tackifier resin.

Also, especially for use in medical applications, the residual solvent in the tackifier resin is less than about 500 ppm based on the weight of the tackifier resin, preferably less than about 200 ppm, and most preferably, less than 50 ppm.

In another embodiment, tackifier resins with an aromaticity of 45% or higher together with an acid number of 100 mg KOH/g resin or lower can have particularly good compatibility with radiation-curable compositions. In addition, a tackifier resin having a softening point of 80° C. or higher can impart particularly good cohesion properties in the radiation-curable adhesive composition, as measured by the SAFT and 180° Shear resistance tests. Softening point and molecular weight of the tackifier resin can be controlled independently by adapting the polymerization conditions including the reaction temperature and the initiator level.

In another embodiment of this invention, the tackifier resin comprises monomer repeating units from at least one aromatic monomer and monomer repeating units from at least one acrylate monomer, wherein the monomer repeating units is at least one selected from styrene, acrylic acid, and 2-ethylhexyl acrylate. The amount of styrene repeating units can range from 0 to 100% based on the total amount of monomer repeating units in the tackifier resin. The amount of acrylic acid and 2-ethylhexyl acrylate can range from 0 to 100% based on the total amount of monomer repeating units in the tackifier resin. Preferably, the amount of styrene repeating units can range from about 20% to about 70%, and the combined amount of acrylic acid repeating units and 2-ethylhexyl acrylate repeating units can range from about 30% to about 80%. Most preferably, the amount of styrene repeating units can range from 25% to 65%, and the combined amount of acrylic acid repeating units and 2-ethylhexyl acrylate repeating units can range from 35% to 75%.

When polymerization occurs at a temperature lower than about 160° C., the amount of acrylic acid in the tackifier resin can be less than about 30% in order to help prevent gelling of the tackifier resin. However, at polymerization temperatures in the range of about 160° C. to about 250° C., the amount of acrylic acid in the tackifier resin can range from 0 to 100%.

The radiation-curable composition is any composition that can be tackified and cured by radiation. In one embodiment, the radiation-curable composition is at least one selected from the group consisting of acrylic compositions, epoxides, urethanes, isoprene compositions, styrene block copolymers, and mixtures thereof. Acrylic compositions include, but are not limited to, acrylic monomers, acrylic oligomers, and acrylic polymers. Any acrylic compounds can be utilized that are compatible with the tackifier resin and can be cured by radiation.

Any acrylic monomers known in the art can be utilized that can be tackified and cured by radiation. In one embodiment, the acrylic monomers utilized can be at least one from the acrylic monomers listed previously in this specification for tackifier resins. Preferably, the acrylic monomer is at least one selected from the group consisting of acrylic acid, 2-ethylhexyl acrylate, methyl methacrylate, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl (meth)acrylate, hydroxyethyl methacrylate, hydroxyethyl acrylate, allyl methacrylate, cyclohexyl methacrylate, cyclohexyl acrylate, n-hexyl acrylate, n-hexyl methacrylate, isobornyl acrylate, isobornyl methacrylate, and the like.

Any acrylic oligomers known in the art can be utilized that can be tackified and cured by radiation. In one embodiment, the acrylic oligomers can comprise repeating units from at least one acrylic monomer listed previously in this specification for tackifier resins. Preferably, the acrylic oligomers comprise at least one repeating unit selected from the group consisting of acrylic acid, 2-ethylhexyl acrylate, methyl methacrylate, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl(meth)acrylate, hydroxyethyl methacrylate, hydroxyethyl acrylate, allyl methacrylate, cyclohexyl methacrylate, cyclohexyl acrylate, n-hexyl acrylate, n-hexyl methacrylate, isobornyl acrylate, isobornyl methacrylate, and the like.

Acrylic polymers include both homopolymers, copolymers, and terpolymers. The copolymers can be random, block or graft. The acrylic polymers can comprise repeating units from any acrylic monomer known in the art. In one embodiment, the acrylic polymer can comprise at least one acrylic monomer listed previously in this specification for tackifier resins.

Acrylic polymers can be produced by copolymerizing acrylic monomers with polar copolymerizable monomers. Examples of such polar copolymerizable monomers include, but are not limited to, cyanoalkyl acrylates, acrylamides, substituted acrylamides, N-vinyl pyrrolidone, N-vinyl caprolactam, acrylonitrile, vinyl chloride, vinylidene chloride, diallyl phthalate, and the like. When polar copolymerizable monomers are utilized, the amount of the polar copolymerizable monomer ranges from 0 to about 50% by weight based on the weight of the acrylic polymer, preferably from 0 to 30% by weight.

Examples of radiation-curable acrylic polymers include, but are not limited to, acrylic copolymers, acrylated polyethers, acrylated polyester-based polyurethanes, methacrylated polyesters, and acrylated epoxies.

Examples of commercially available radiation-curable acrylic polymers include, but are not limited to:

acResin® A 203 UV, a UV reactive, solvent free, acrylic copolymer with a Tg of about −31° C. and a viscosity of about 15000 mPa·s at 120° C. produced by BASF; and acResin® A 258 UV, a UV reactive, solvent free, acrylic copolymer with Tg of about −39° C. and a viscosity of about 24000 mPa·s at 120° C. produced by BASF.

These radiation-curable acrylic polymers are especially useful in hot-melt adhesive applications.

The amounts of tackifier resin and radiation-curable composition in the radiation-curable adhesive composition varies depending on the properties of the radiation-curable adhesive composition desired. In one embodiment of this invention, the amount of tackifier resin ranges from about 0.1% to about 50% based on the weight of the radiation-curable adhesive composition, preferably 0.1% to 25%.

The radiation-curable adhesive composition can contain a photo-initiator. The photo-initiator can include any photo-initiator known in the art. Suitable photo-initiators include, but are not limited to, aldehydes, such as benzaldehyde, acetaldehyde, and their substituted derivatives; ketones, such as, acetophenone, benzophenone and their substituted derivatives; quinines, such as, benzoquinones, anthraquinone and their substituted derivatives; thioxanthones, such as, 2-isopropylthioxanthone and 2-dodecylthioxanthone; and certain chromophore-substituted vinyl halomethyl-sym-triazines, such as, 2-4-bis-(trichloromethyl)-6-(3', 4'-dimethoxyphenyl)-sym-triazine. The concentration of the photo-initiator can be present in a range of about 0.05% to about 6% by weight based on the weight of the radiation-curable composition, preferably about 0.1% to about 2% by weight of the radiation-curable composition, and more preferably 0.5% to 1.5% by weight.

The radiation-curable adhesive composition can also contain a crosslinking agent. Any crosslinking agent known in the art can be utilized. Suitable examples include, but are not limited to, substituted triazines such as 2,4-bis(trichloromethyl)-6-p-methoxystyryl-s-triazine and the chromophore-substituted halomethyl-s-triazines disclosed in U.S. Pat. Nos. 4,329,384, and 4,330,590; herein incorporated by reference. Other useful crosslinking agents include multi-functional alkyl acrylate monomers, such as, but not limited to, trimethylolpropane triacrylate, pentaerythritol tetraacrylate, 1,2-ethylene glycol diacrylate, 1,6 hexanediol diacrylate, and 1,12-dodecanediol diacrylate. The amount of the crosslinking agent in the radiation-curable adhesive composition ranges from about 0.05% by weight to about 25% by weight based on the weight of the tackifier resin, preferably from 0.1% to 10% by weight.

The composition of the radiation-curable adhesive composition may be adjusted by adding a surfactant or by diluting with water or an aqueous medium. In addition, various additives can be added to the radiation-curable adhesive composition to give the radiation-curable adhesive composition desired properties or for preventing degradation, or for any other purpose. Such additives include, but are not limited to, reinforcing agents, fire retardants, foaming agents, conventional tackifiers, plasticizers, oils, antioxidants, polymers, curable/reactive monomers, crosslinking agents, fillers, and pigments. Because of the number of possible compounding ingredients, the properties of the radiation-curable adhesive composition prepared according to this invention can be varied to satisfy most foreseeable requirements for tack, peel, strength, shear strength, and solvent media resistant, on whatever combination of substrate utilized.

In another embodiment of this invention, a process is provided to produce the radiation-curable adhesive composition. The process comprises contacting at least one tackifier resin and at least one radiation-curable composition. The tackifier resin and radiation-curable composition were previously described in this disclosure.

The term "radiation" means all forms of radiation capable of curing the radiation-curable adhesive composition including, but not limited to, ultraviolet light, electron beam, gamma ray, and X-ray. The amount of exposure is that which is sufficient to cause the radiation-curable composition to cure. The term "cure" refers to both crosslinking and curing. "Crosslinking" is defined as the formation of chemical or physical interactions between polymer chains. The term "curing" is more broad than the term "crosslinking" and includes the total polymerization process from initiation of the reaction to when the radiation-curable adhesive composition is produced. Therefore, the term "curing" as used in this application includes the polymerization of radiation-curable compositions as well as the crosslinking of radiation-curable compositions with tackifier resins.

Typically, when UV light is utilized to cure the radiation-curable composition, the effective ultraviolet wavelength (UV-C) (defined in the examples) ranges from about 100 nm to about 400 nm, preferably from 100 nm to 280 nm.

When electron beam radiation is used, the amount is that which is sufficient to effect curing for the application involved. Generally, the amount of electron beam radiation ranges from about 1 megarads (Mrads) to about 30 Mrads, preferably from about 1 to about 20 Mrads, more preferably, from 2 to 10 Mrads. Suitable processes for curing with electron beam radiation is found in U.S. Pat. No. 4,533,566, herein incorporated by reference. Electron beam radiation can be obtained from any source known in the art. Examples of sources include, but are not limited to, an atomic pile, a resonant transformer accelerator, a Van de Graaf electron accelerator, a Linac electron accelerator, a betatron, a cynchrotron, a cyclotron, or the like.

In another embodiment of this invention, a process is provided to produce a radiation-cured adhesive composition. The process comprises: 1) providing at least one tackifier resin and at least one radiation-curable composition to produce a radiation-curable adhesive composition, 2) contacting the radiation-curable adhesive composition with at least one substrate, and 3) exposing the radiation-curable adhesive composition to radiation to produced the radiation-cured adhesive composition.

Variations of properties of a given radiation-curable adhesive composition can be obtained by varying the process conditions. For example, properties can be changed by the selection of substrate, by curing in air or an inert atmosphere, and by varying the intensity of the radiation.

The radiation-curable adhesive composition can be coated on a substrate by any method known in the art. For example, the coating can be accomplished by knife coating, roll coating, gravure coating, and curtain coating. Coating thickness varies depending on the application. Suitable coating thicknesses can range from about 0 $g/m^2$ to about 200 $g/m^2$, preferably, from 10 $g/m^2$ to 100 $g/m^2$.

The radiation-curable adhesive composition can be coated on a wide array of substrates. Suitable examples include, but are not limited to, polymer films such as polyethylene terephthalate (PET) and biaxially oriented polypropylene (BOPP); woven and non-woven fabrics; metals and metal foils, such as aluminum copper lead, gold and the like; paper; glass; ceramics; and composite materials comprising laminates of one or more of these materials.

The radiation may be applied to the adhesive either by moving the radiation source while the coated substrate is stationary, or by moving the coated substrate past the radiation source.

In another embodiment of this invention, a UV-cured adhesive composition can be produced by a process comprising: 1) contacting a styrene-acrylate tackifier resin and an acResin® acrylic copolymer to produce a UV-curable adhesive composition; 2) contacting the UV-curable adhesive composition with at least one substrate, and 3) exposing the UV-curable adhesive composition to UV light having a wavelength in the range of about 220 nm to about 280 nm to produce the UV-cured adhesive composition. The styrene-acrylate tackifier resin comprises monomer repeating units from styrene and at least one acrylic monomer. Preferably, the acrylic monomer is acrylic acid and 2-ethylhexyl acrylate.

In another embodiment, at least one radiation-curable acrylic monomer or oligomer and at least one photo-initiator are mixed to produce a mixture. The mixture is then polymerized to a viscosity sufficient to produce a coatable syrup. Preferably, a viscosity of about 400 to 50,000 cp is achieved. Alternatively, the radiation-curable acrylic monomer or oligomer can be mixed with a thixotropic agent, such as fumed silica, to produce the coatable syrup. The tackifier resin is then mixed with the coatable syrup to produce the radiation-curable adhesive composition. Optionally, additional photo-initiator can be added as well as a crosslinking agent.

This radiation-curable adhesive composition is then coated onto a substrate and cured by radiation in an inert atmosphere i.e. oxygen-free, for example, in a nitrogen atmosphere. For example, a sufficiently inert atmosphere can be achieved by covering a layer of the photoactive coating with a plastic film which is substantially transparent to radiation and irradiating through that film in air. For example, ultraviolet radiation can be obtained from fluorescent-type lamps.

Another method of achieving an inert atmosphere involves the addition of an oxidizable tin to the radiation-curable adhesive composition. The oxidizable tin allows for a higher permissible oxygen-content in the inert atmosphere.

Possible adhesive applications in which the radiation-curable adhesive composition may be used are numerous. Examples include, but are not limited to, skin-contact medical applications, surgical tapes, bandages, wound care, operation tapes and drapes, hygiene applications including feminine care products, box sealing tapes, masking applications, low fogging, automotive interior applications including foam gaskets, instrument displays, sound deadening, trim bonding, sealants, chaulks, general pressure sensitive adhesives, semi-pressure sensitive adhesives, building and hydroxyl ion adhesives, assembly adhesives, adhesive films and membranes, bottle labeling, water soluble adhesives, laminating adhesives, adhesives for flexible packaging, concrete curing compounds, mounting tapes, double sided tapes, electrical tapes, permanent and removable labels, filmic labels, pressure sensitive adhesives for the graphic industry, labels for laser printers, insulation tapes, primer compounds, tie layers, road marking adhesives, inks, mounting tapes, labels for chemicals including sea water resistant labels, and labeling for pharmaceuticals and cosmetics, etc.

Another embodiment of this invention comprises a laminated structure of at least a first and a second substrate, the substrates being joined by a layer of the radiation-curable adhesive composition. At least one of the substrates being capable of transmitting radiation so that the radiation-curable adhesive composition can be cured.

The invention has been described in detail with particular reference to preferred embodiments thereof, but it will be understood that variations and modifications can be effected within the spirit and scope of the invention.

EXAMPLES

This invention can be further illustrated by the following examples of preferred embodiments thereof, although it will be understood that these examples are included merely for purposes of illustration and are not intended to limit the scope of the invention unless otherwise specifically indicated.

Test Methods

Acid number was determined by ASTM D974-02.

Compatibility of the tackifier resin was determined by mixing the tackifier resin with a UV-curable acrylic composition in the desired ratio at 150° C. The mixture was then poured on a heat bank. The heat bank consisted of a metal plate with a temperature gradient from 50° C. to 200° C. On the left side, the heat bank was cool, on the right side, the heat bank was warm, and in between these two points, a temperature gradient was calibrated. A clear tackifier resin/UV-curable acrylic composition indicated a compatible system. Hazy mixtures were incompatible. When the mixture stayed clear over the entire heat bank, the cloud point or compatibility temperature was <50° C. When the mixture was cloudy over the entire bank, the cloud point was >200° C. When the mixture was clear above a certain temperature and cloudy below a certain temperature, the temperature at which it was cloudy was the cloud point. Table 1 below summarizes the results of this test:

TABLE 1

Compatibility Test

| Compatibility Temperature | Results |
|---|---|
| Compatibility temperature < 50° C. | Completely compatible system |
| 100° C. > compatibility temperature > 50° C. | Reasonable compatible system |
| 150° C. > compatibility temperature > 100° C. | Partly compatible system |
| Compatibility temperature > 150° C. | Incompatible system |

Fogging was determined by ASTM D5393-97.

Gardner Color was measured using ASTM D1544-98.

Hydroxy number was measured using ASTM D464.

Loop tack was determined according to the European Association For Self Adhesive Tape Industry (AFERA) method 4015.

Lymph Node Assay was conducted accorded to the Organisation for Economic Co-operation and Development (OECD) draft new guideline 429: Skin Sensitization: Local Lymph Node Assay (LLNA) and according to the OECD Principles of Good Laboratory Practice (as revised in 1997), Paris, ENV/MC/CHEM(98)17.

Three deviations were made in the LLNA. First, the mice were marked for identification differently. Secondly, the protocol calls for $CO_2/NO_2$ anesthesia at autopsy, however, due to practical reasons, the mice were sacrificed by using euthasate. Thirdly, instead of analysis of (co)variance followed by Dunnett's multiple comparison tests, statistical analyses were performed by means of the Welch-ANOVA (for $^3$H-thymidine incorporation in the auricular lymph nodes (ARN)) because Levene's test for variances showed that variances occurred between the different groups.

Mettler Drop Softening Point (MDSP) was determined by a modified ASTM D6090-99 method. The method was modified in that the measurement was performed without a ball and using a cup with a 4.5 mm hole.

MMAP Cloud Point (methylcyclohexane and aniline) was determined by ASTM D-611.

Molecular weight distribution parameters, Mn, Mw, Mz and Mp (weight at the top of the peak) were determined by Gel Permeation Chromatography (GPC) on a Waters GPC 2690 system equipped with Waters Styragel HR2 (7.8×300 mm) columns and a Waters 410 RI detector. Polystyrene standards were used for calibration.

Moisture Vapor Transport Rate (MVTR) was measured by ASTM 3-96.

Peel was determined by AFERA 4001. The following definitions are utilized to interpret the data from this test. Cohesive failure and slip-stick are defined in the Handbook of Pressure Sensitive Adhesive Technology, 2nd Edition, edited by Don Satas and Van Nostrand Reinhold. Cohesive failure is a failure mode leaving adhesive residue on the test panel. Slip-stick is a failure mode in which the peel force is not smooth but starts to fluctuate periodically from low to high force.

Residual monomer levels were determined by a gas chromatograph (GC) for the styrene, 2-ethylhexyl acrylate and xylene and with a high performance liquid chromatograph (HPLC) for acrylic acid.

The procedure followed when using the gas chromatograph is described below. About 5 grams of the sample and 50 mg anisole were placed in a flask, and 10 ml of acetonitrile were added. Then, the sample was dissolved in an ultrasound bath. A Trace 2000 GC Thermo Quest was utilized having a CP-WAX 57 CB (Chrompack) column having a length of 25 meters, an inner diameter of 0.25 mm, and a film thickness of 0.2 um. The temperature was 50° C. for 20 minutes with a change of temperature of 4° C. per minute, and a maximum of 200° C. was achieved for 5 minutes. The detector was a FID at 230° C. A split injector was utilized, and the carrier was hydrogen. The internal standard utilized was 250 mg anisole, and 50 mg of the substance to be analyzed (e.g. xylene, acrylate) were dissolved in 10 ml of acetonitrite.

The procedure followed when using HPLC is described below. This method was used for the analysis of styrene-acrylate tackifier resins to determine the residual acrylic acid content. The samples were dissolved in tetrahydrofuran or carbon disulfide and then filtered prior to analysis by reverse phase HPLC. An external standard of acrylic acid was used for calibration. The acrylic acid standard and the styrene-acrylate tackifier resin samples were analyzed on a Zorbax® RX-C18 column (5 µm), using a two-part gradient. This two-part gradient consisted of part (1) 2% methanol in 0.05 M phosphoric acid for the elution of the acrylic acid and part (2) 100% tetrahydrofuran for purging the column during the actual sample analysis. The purge helped to minimize chromatographic problems for repetitive analysis. Peak detection was accomplished by monitoring the eluent with a UV detector. The primary UV wavelength monitored was 200 nm. The average response factor for acrylic acid was determined by several injections. The calibration curve of the acrylic acid standard was linear over the range of 0–1000 ppm with a lower limit of detection of about 5 ppm.

The following is a summary of the apparatus and chromatographic conditions utilized for the HPLC.

Apparatus:

(1) Liquid chromatograph, Hewlett-Packard Model 1090, or equivalent.
(2) Ultraviolet (UV) detector, Hewlett-Packard Model 1100, or equivalent.
(3) Data system or integrator capable of measuring peak area.
(4) Column, Zorbax® RX-C18 (5 μm), 150 mm×4.6 mm—available from Agilent located in Palo Alto, Calif.
(5) Guard column cartridge, Zorbax® RX-C18 (5 μm), 12.5 mm×4.6 mm—available from Agilent, or equivalent.
(6) Sample loop injection valve, 5 μL, Rheodyne Model 7125—available from Supelco located in Bellefonte, Pa.
(7) Vortex mixer—available from VWR Scientific located in West Chester, Pa.

Chromatographic Conditions

| | |
|---|---|
| Flow rate: | 1.0 ml/min |
| Injection volume: | 5 μL |
| Column oven temperature: | 40° C. |
| Detector: | UV |
| Wavelengths: | 200 nm, 210 nm |
| Mobile Phase: | A = Methanol/5 mmol $H_3PO_4$ in water (2/98) |
| | B = Tetrahydrofuran (100) |
| Gradient: | Part 1) 0–10.10 min 100% A |
| | Part 2) 10.10–25.0 min 100% B (column purge) |

Ring and Ball Softening Point was determined by ASTM E-28 with Walter Herzog MC-753 equipment.

Shear Adhesion Failure Test (SAFT) was determined when tape was placed on a metal plate weighing 1 kg. The tape on this plate was heated from 30° C. with the heat increasing by 0.37° C./minute until the tape released from the plate.

Shear was determined by AFERA 4012.

UV absorbance was measured spectrophotometrically using a DR/4000 U Spectrophotometer supplied by Lange Group in Tiel, The Netherlands.

UV-C is the effective wavelength for curing a UV-curable adhesive composition. UV-C was measured with a calibrated UVICURE PLUS 8788, a self-contained electro-optic radiometer obtained from Electronic Instrumentation and Technology, Inc, Sterling, Va.

In some experiments, the total UV dose was measured. In others, the UV-C dose was measured. A relation between total UV dose and UV-C dose was determined for the equipment utilized in these examples. Testing was conducted by varying the UV dose for some UV-curable adhesive compositions. The results are given in FIG. 1 and Table 2

TABLE 2

Relation Between Total UV Dose and UV-C Dose for the Equipment Used

| UV total | UV-C |
|---|---|
| 139 | 18 |
| 195 | 26 |
| 311 | 42 |
| 470 | 64 |

Table 2 and FIG. 1 can be used to compare the results when measuring total UV rather than UV-C.

Inventive Example 1

Synthesis of the Inventive Styrene-Acrylate Tackifier Resins

Styrene-acrylate tackifier resins were produced in a high-pressure reactor using a fed batch method. Xylene was used as a solvent and was pumped into the reactor and heated with stirring under nitrogen atmosphere to 150° C. The monomers (styrene, acrylic acid, and 2-ethyl hexyl acrylate) and 2% by weight initiator based on the weight of the monomers were mixed to produce a monomer-initiator feed stream. The monomer-initiator feed stream was added gradually to the hot solvent over two hours to produce a reaction mixture. During the addition of the monomer-initiator feed, the reaction temperature was maintained at 150° C.

After the monomer-initiator feed stream addition was completed, the reaction mixture was stirred for another 30 minutes at this temperature and at a pressure of about 3 bar. Subsequently, a small amount of initiator was post-added, and the process was maintained for another 30 minutes at 150° C. to produce a tackifier resin product stream. The styrene-acrylate tackifier resin was isolated from the tackifier resin product stream by distilling off the solvent. The temperature was slowly increased to 170° C., and vacuum was applied up to 25 mbar. After about 30 minutes, 90% of the solvent was evaporated. After 2.5 hours, the temperature reached 170° C. and vacuum reached 25 mbar, and about 99% of the solvent was removed. At this point, steam from the bottom of the reactor was injected resulting in about 0.5 liter of condensate per minute. Vacuum was slightly increased to 40 mbars as a result of the steam stripping. Steam stripping of the styrene-acrylate tackifier resin occurred for about 9 hours for Formulation 1 and 7 hours for Formulation II. The properties of the styrene-acrylate tackifier resin produced in this process are given in Table 3.

TABLE 3

Tackifier Resin Formulations and Properties

| | Styrene-Acrylic Tackifier Formulation I | Data before steaming | Styrene-Acrylic Tackifier Formulation II | Data before steaming |
|---|---|---|---|---|
| Styrene (wt %) | 61.2 | | 24.9 | |
| 2-Ethylhexyl acrylate (wt %) | 30.7 | | 44.2 | |
| Acrylic acid (wt %) | 8.0 | | 13.7 | |
| $DTBP^1$ (wt % based on total monomer weight) | 1.7 | | 1.5 | |
| Temperature (° C.) | 153 | | 150 | |
| R&B Softening Point (° C.) | 99.7 | 98.3 | 82.1 | |
| Color, Gardner | 0.1 | 0.1 | 0.5 | |
| Acid Number, mg KOH/g | 60.1 | 59.1 | 112 | |
| Mz, Daltons | 15060 | | 13400 | |
| Residuals: | | | | |
| Styrene, ppm | 29 | 34 | <10 | 20 |
| 2-ethylhexyl acrylate, ppm | 12 | 476 | 40 | 990 |
| Acrylic Acid, ppm | 110 | 218 | 134 | |
| Solvent ppm | 24 | 1092 | <10 | 640 |

$^1$DTBP—di-tert butyl peroxide

Residual styrene levels were less than 29 ppm, and residual 2-ethylhexyl acrylate levels were less than 40 ppm. Residual acrylic acid was less than 134 ppm, and residual solvent was less than 24 ppm. These levels were significantly less than the residual monomer and solvent levels of the styrene-acrylate tackifier resins prior to steaming and to other commercial tackifiers as shown in Comparative Example 2. It should also be noted that the other properties of the styrene-acrylate tackifier resins were hardly effected by removing a substantial portion of the residual monomers. Low levels of residual monomers are extremely important for the end application, since the residual monomers can cause skin sensitivity. Low residual monomer and solvent levels in the tackifier resins can also positively influence the fogging behavior of the UV-curable adhesive composition.

As can be observed from the data in Table 4, the residual monomer concentration for the tackifier resins from SC Johnson are significantly above the inventive tackifier resins.

Example 3

Variation of Monomer Repeating Unit Amounts in Styrene-Acrylate Tackifier Resins—Effect on Properties The amount of the monomer repeating units in the styrene-acrylate tackifier resins were varied using the same process as described in Example 1, and the resulting properties of the styrene-acrylate tackifier resins were monitored. The results of these experiments are given in Table 5.

TABLE 5

Variation of Monomer Amounts in Styrene-Acrylate Tackifier Resins - Effect on Properties

| Exp. No | styrene wt % | acrylic acid wt % | 2-ethyl hexyl acrylate wt % | MDSP °C. | Colour Gardner | Acid number mg KOH/g | MMAP °C. | Mp Dalton | Mn Dalton | Mw Dalton | Mz Dalton |
|---|---|---|---|---|---|---|---|---|---|---|---|
| 3.1 | 25 | 5 | 70 | 44.9 | 0.1 | 39 | 6 | 7123 | 3519 | 8358 | 15921 |
| 3.2 | 25 | 15 | 60 | 84.4 | 0.4 | 112 | 7 | 8462 | 3729 | 10139 | 21198 |
| 3.3 | 25 | 25 | 50 | 114.9 | 0.6 | 187 | 15 | 7725 | 3390 | 9382 | 18976 |
| 3.4 | 38.3 | 11.7 | 50 | 95.9 | 0.2 | 88 | 4 | 10100 | 4099 | 11752 | 23766 |
| 3.5 | 38.3 | 18.3 | 43.3 | 112.9 | 0.3 | 130 | 16 | 10916 | 3859 | 12729 | 27459 |
| 3.6 | 45 | 5 | 50 | 76.2 | 0.3 | 35 | −2 | 11030 | 4434 | 12299 | 23896 |
| 3.7 | 45 | 25 | 30 | 141.2 | 0.7 | 172 | 32 | 12128 | 4087 | 18170 | 52090 |
| 3.8 | 51.7 | 11.7 | 36.7 | 116.4 | 0.2 | 87 | 15 | 12560 | 4712 | 14004 | 27649 |
| 3.9 | 55 | 20 | 25 | 142.7 | 0.5 | 141 | 31 | 12418 | 3953 | 14815 | 32181 |
| 3.10 | 65 | 5 | 30 | 108.5 | 0.2 | 37 | 11 | 12712 | 5138 | 13953 | 25842 |
| 3.11 | 65 | 15 | 20 | 141.4 | 0.2 | 110 | 27 | 12997 | 4405 | 14603 | 28915 |
| 3.12 | 65 | 25 | 10 | 171.2 | 1.5 | 149 | 44 | 13415 | 3831 | 20018 | 51019 |

Comparative Example 2

Residual Monomer Concentrations in Other Tackifiers

Tackifier resins were obtained from SC Johnson and evaluated to determine the amount of residual monomers. The data are shown in Table 4.

TABLE 4

Residual Monomer Levels in Comparative Tackifiers

| Product Name | Joncryl 586 | Joncryl 678 | Joncryl SX815 |
|---|---|---|---|
| R&B (° C.) | 121.8 | 165 | 115.3 |
| Acid Number (mg KOH/g) | 104 | 216 | 39 |
| Gardner Color | 0 | 0 | 0 |
| MMAP (° C.) | 35 | 57 | 42 |
| Mp (Daltons) | 4161 | 8064 | 10285 |
| Mn (Daltons) | 2692 | 4621 | 5455 |
| Mw (Daltons) | 4921 | 9663 | 11275 |
| Mz (Daltons) | 8432 | 17755 | 19550 |
| Residual Monomer | | | |
| Acrylic Acid (ppm) | 585 | 2200 | 580 |
| Styrene (ppm) | 1200 | 200 | 60 |
| Alpha-methyl styrene (ppm) | 1000 | 800–900 | 600 |

When the amount of monomer was varied, styrene-acrylate tackifier resins were obtained with a MDSP from about 44.9° C. to about 171.2° C., with acid numbers from 35 mg KOH/g to 187 mg KOH/g, a MMAP from 4° C. to 32° C., and a Mz from 15921 to 51019 Dalton. More styrene instead of acrylic acid or 2-ethylhexylacrylate made the styrene-acrylate tackifier resin more aromatic resulting in a higher MDSP and a higher Mz. More acrylic acid increased the acid number and the functionality. It also increased the softening point and the MDSP.

Example 4

Skin Sensitivity of the Tackifier Resin

A local lymph node assay test (LLNA) in mice was performed to determine if the styrene-acrylate tackifier of formulation II in Example 1 has skin sensitivity properties. Under the experimental conditions, there were no indications that the styrene-acrylate tackifier resin of formulation II (see Example 1) had sensitizing properties.

The basic principle underlying the LLNA is that sensitizers induce a primary proliferation of lymphocytes in the lymph node draining the site of chemical application. This proliferation only occurs with allergens and is proportional to the dose applied. Therefore, the LLNA provides a simple means of obtaining an objective, quantitative measurement of sensitization.

Hexyl cinnamic aldehyde was used as a positive control. The hexyl cinnamic aldehyde was mixed in acetone/olive oil to a concentration of 25% by volume. A mixture of acetone and olive oil in a 4:1 ratio was used as a negative control. The tackifier resin was diluted in acetone/olive oil (4:1 v/v) to the desired concentration.

Twenty mice were divided into 5 groups of 4 animals each. Three groups of 4 mice each were treated with different dosages of the tackifier resin (Group B: 10%; Group C: 25%; and Group D: 50%). Group E was treated with the positive control substance, and Group A was treated with the negative control. On day 0, 1, and 2, the test substance was administered with 25 μl on each ear of the mouse.

The data collected showed that there were no indications that the tackifier resin had skin sensitizing properties.

Example 5

UV Absorption of Various Tackifier Resins

The UV absorption curves of various tackifier resins were determined at 200 and 400 nm. Tackifier resin solutions in cyclohexane or tetrahydrofuran (THF) were prepared and measured. The absorption curves were normalized to 1 gram of tackifier resin/L solution.

Comparative Example 5.1

Rosin Esters

Figure 2:
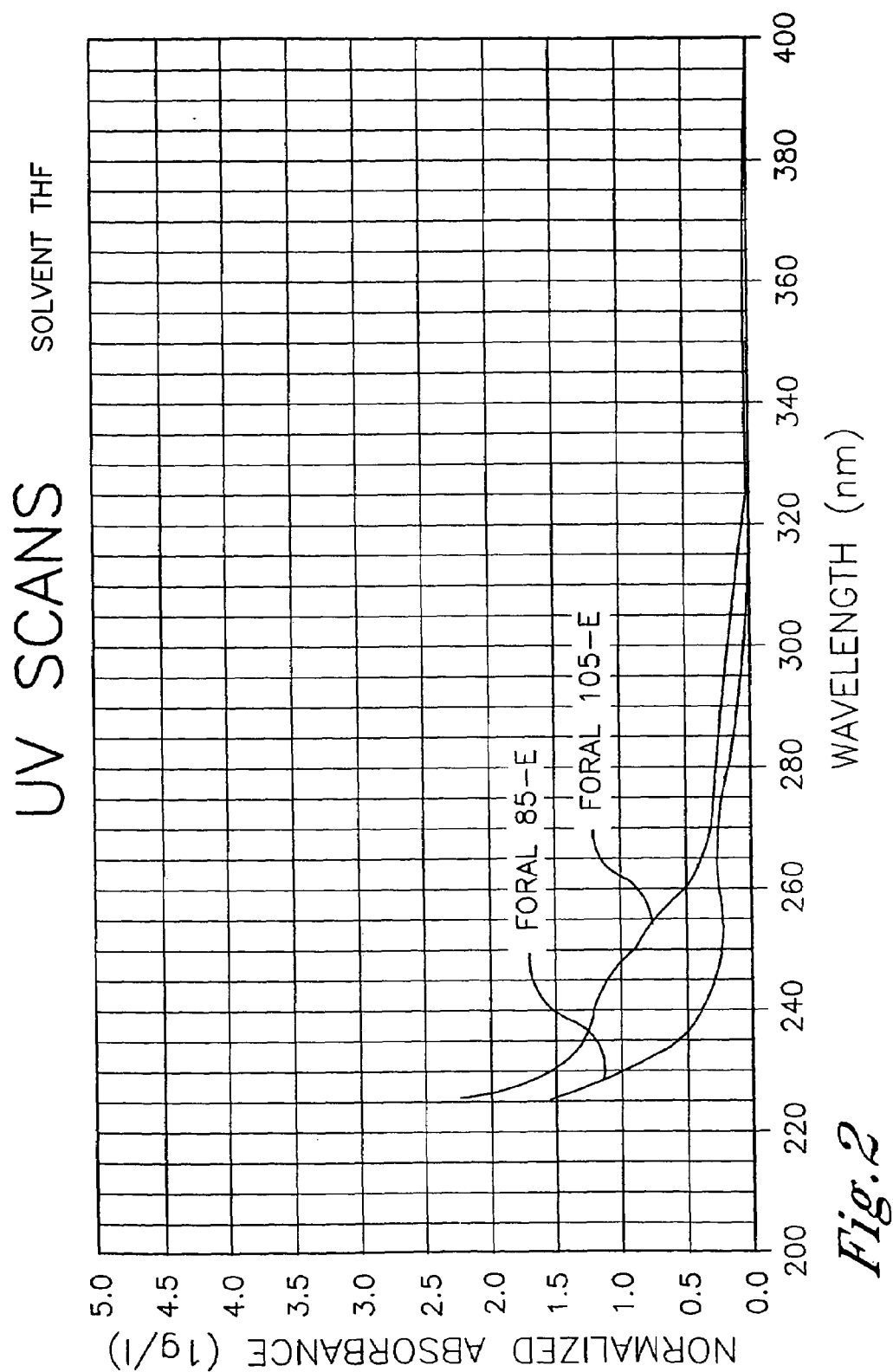
FIGS. 2 and 3 show the UV absorption scan for Foral® rosin esters in THF and cyclohexane respectively.

In FIG. 2, the UV absorption scans of Foral 85-E® rosin ester and Foral 105-E® rosin ester in THF are shown. Foral 85-E® rosin ester and Foral 105-E® rosin ester are esters of fully hydrogenated rosins obtained from Eastman Chemical Company. The highest UV absorption levels were at the shortest wavelengths. At 220 nm, the UV absorption levels were 2.3 and 3.0 for Foral 85-E® rosin ester and Foral 105® rosin ester, respectively. Increasing the wavelength resulted in a decrease of the absorption. Over the whole range (220–280 nm), the absorption of the Foral 105-E® rosin ester was higher than the absorption of Foral 85-E® rosin ester.

Figure 3:
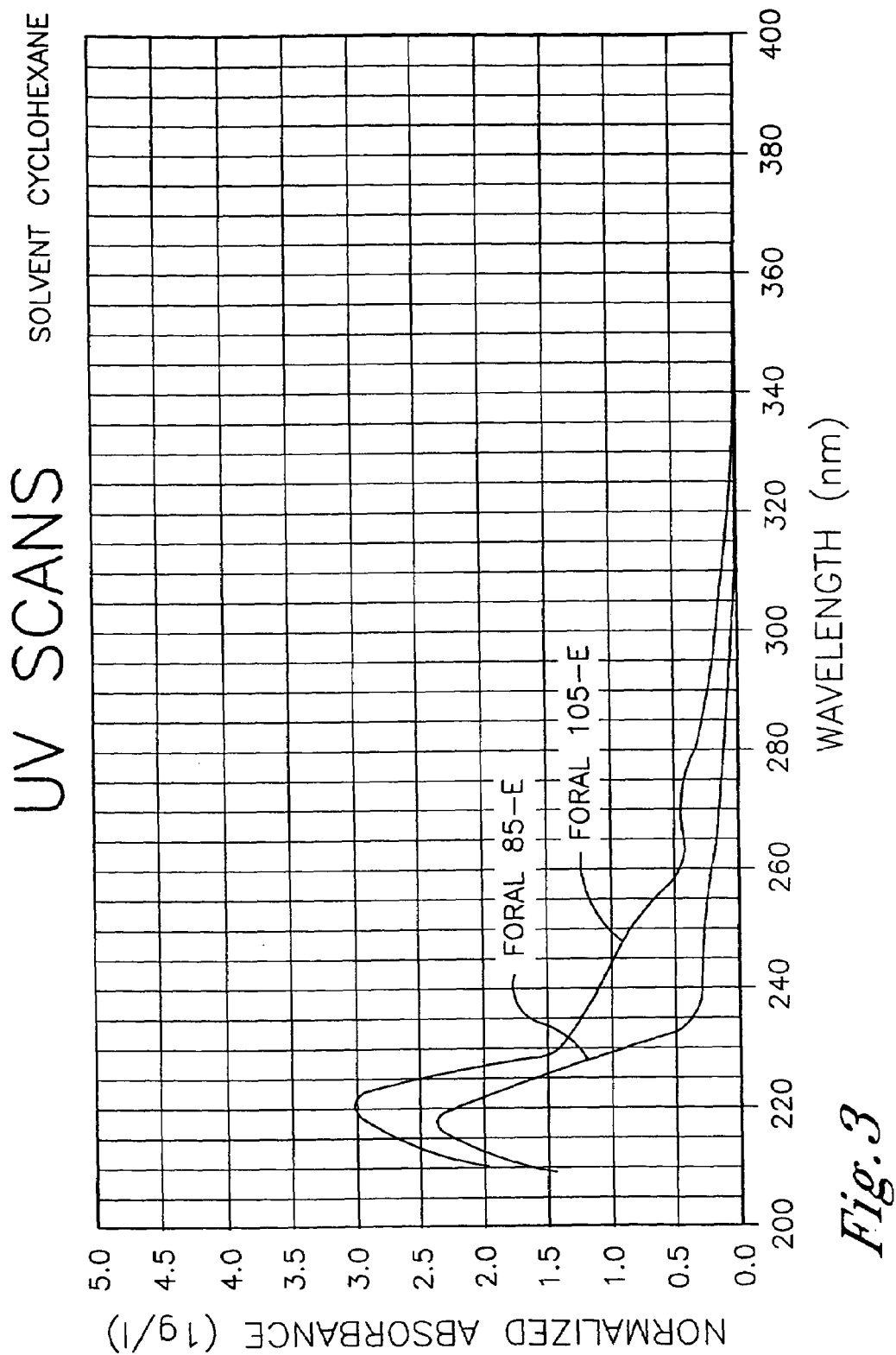

In FIG. 3, the UV absorption curves in cyclohexane are shown.

Comparative Example 5.2

Aromatic Tackifier Resins

Figure 4:
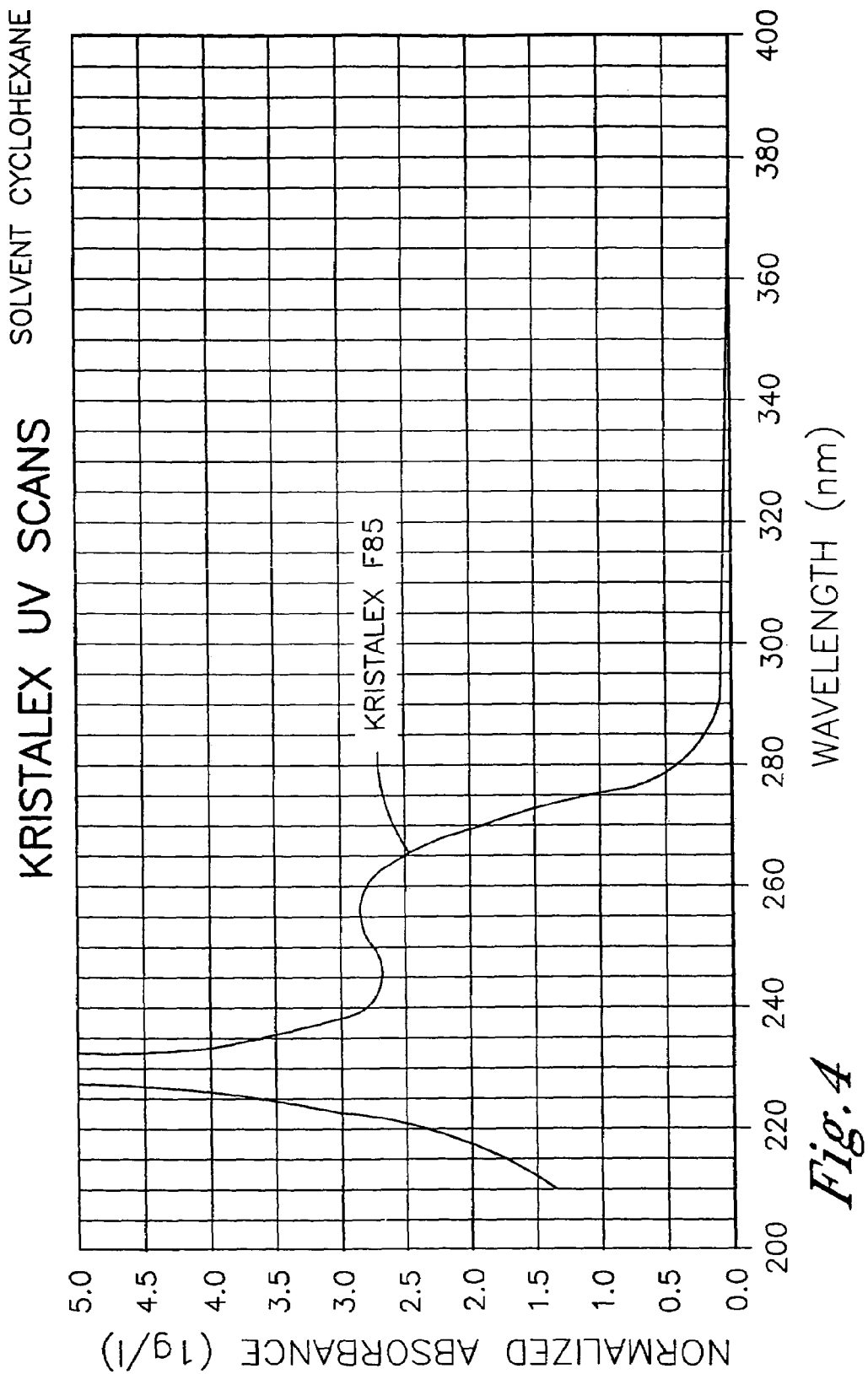
FIG. 4 shows the UV absorption scan for Kristalex® aromatic tackifier resin in cyclohexane.

UV absorption was also measured for Kristalex® F85 aromatic tackifier resin which was obtained from Eastman Chemical Company. Higher UV absorption levels are expected for Kristalex F85® tackifier resin due to the aromatic double bonds. The UV absorption scan in cyclohexane is shown in FIG. 4. Indeed, a higher absorption was observed. Between 220 and 265 nm, the UV absorption was higher than 2.5. For comparison, Foral 85E® rosin ester had a UV absorption between 232 and 280 nm of less than 0.5.

Comparative Example 5.3

$C_9$ Tackifier Resins

Figure 5:
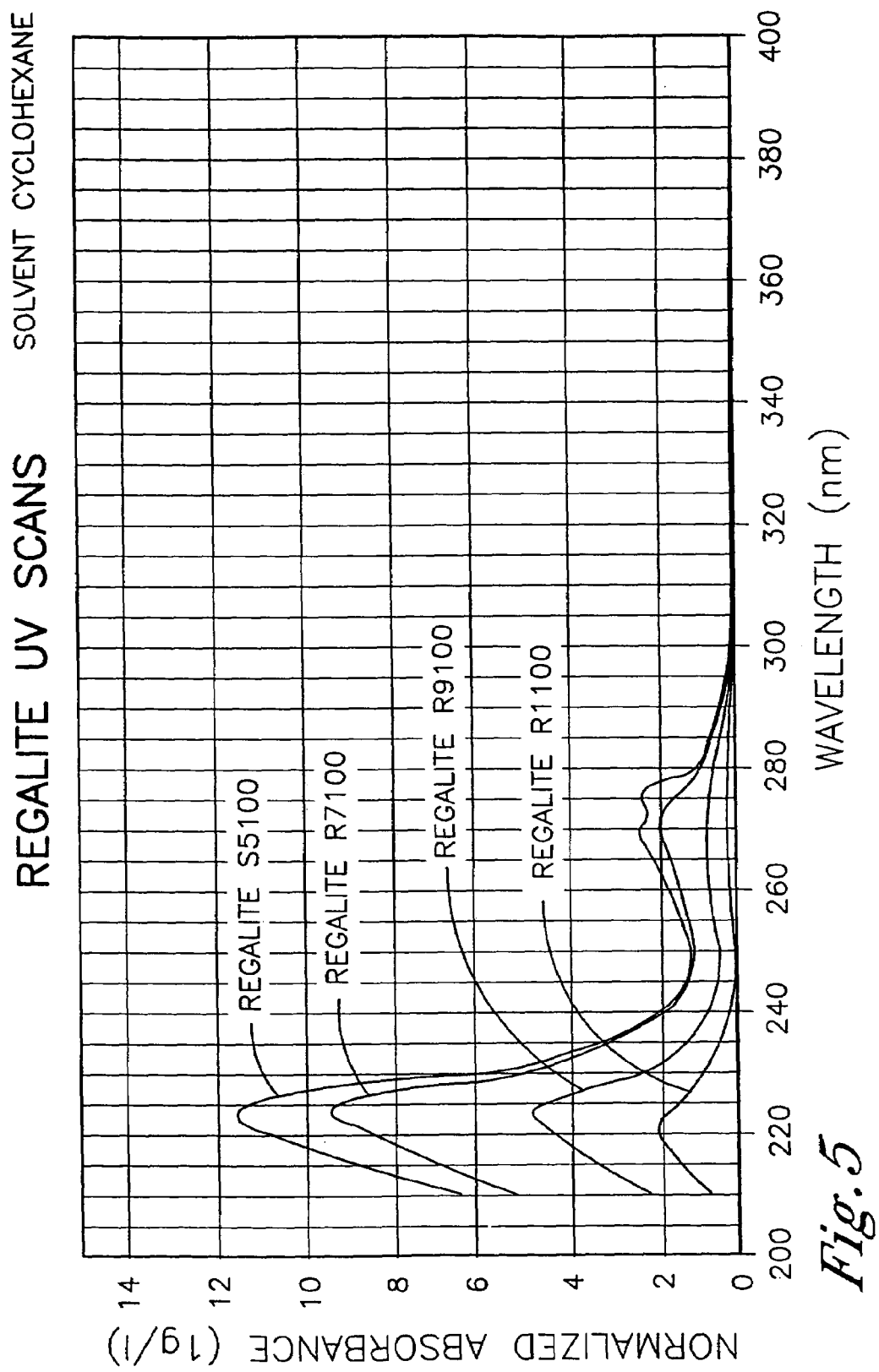
FIG. 5 shows the UV absorption scan for Regalite® $C_9$ tackifier resin in cyclohexane.

In FIG. 5, the UV absorption scans of several $C_9$ tackifier resins sold under the tradename of Regalite by Eastman Chemical Company are shown. A higher absorbance was observed at the shorter wavelengths followed by a decrease and subsequently an increase after 245 nm.

Inventive Example 5.4

Styrene/Acrylic Tackifier Resins

Figure 6:
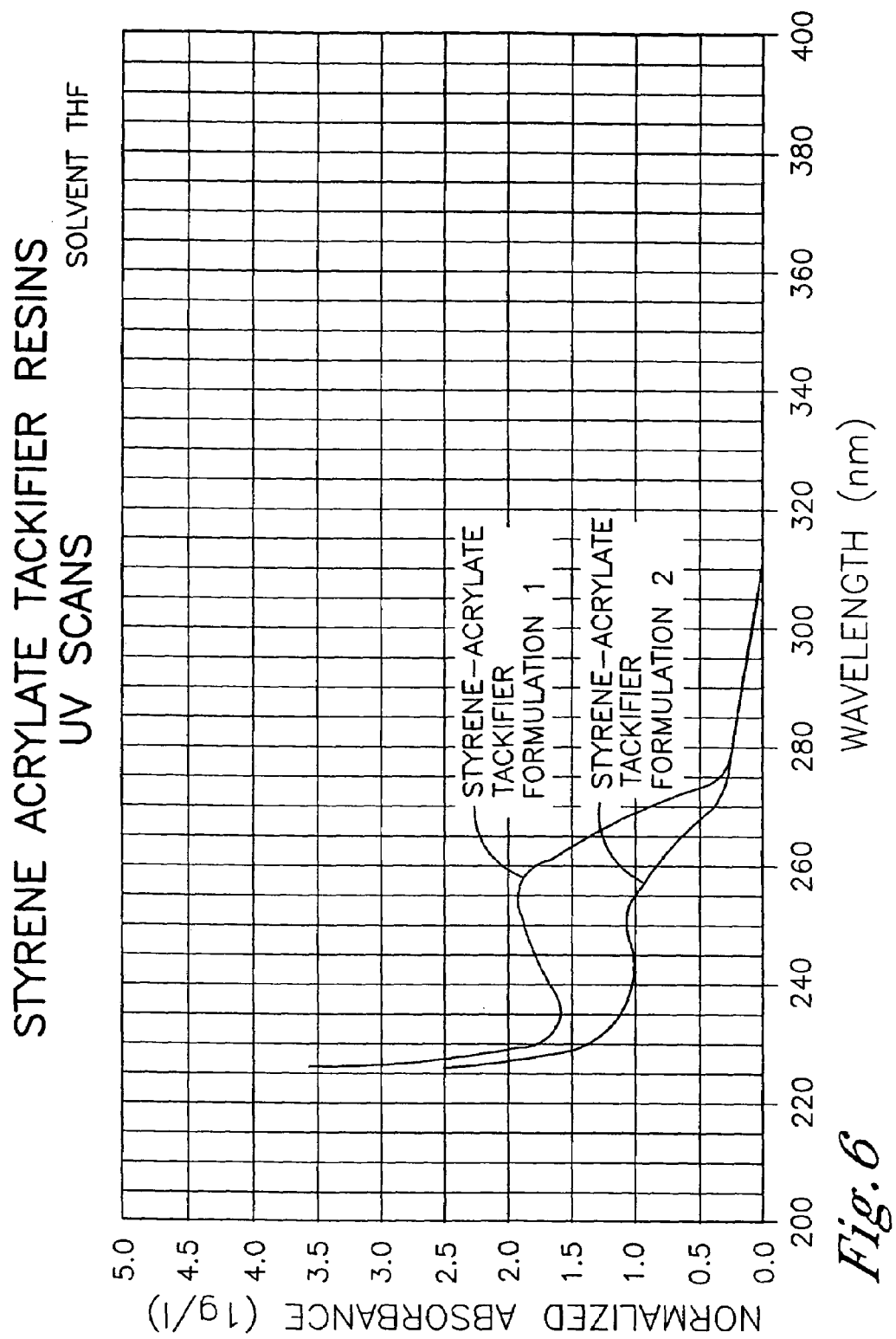
FIG. 6 shows the UV absorption scan for the styrene-acrylate tackifier resins in THF.

In the FIG. 6, the UV absorption scans for the two styrene-acrylates tackifier resins produced in Example 1 are shown. Styrene-acrylate tackifier resin Formulation I had a higher UV absorption than Formulation II, which is probably due to the higher amount of styrene monomer repeating units in Formulation I.

The UV-curable acrylic compositions produced by BASF under the trade names of acResin® UV 203 and 258 show the best curing with UV between 220 nm and 280 nm. Therefore, absorption of other ingredients in the UV-curable adhesive composition, such as the tackifier resin, at the same wavelength should be as low as possible. Table 6 gives the absorption for each of the tackifier resins at 255 nm, which is the wavelength where the acResin® acrylic copolymer is the most active for crosslinking.

TABLE 6

UV Absorption of Various Tackifier Resins at 255 nm in Different Solvents

| Experiment # | Tackifier Resin | Normalized absorption at 255 nm (1 g/l) | |
|---|---|---|---|
| | | THF | Cyclohexane |
| Comparative 5.1 | Foral 85-E, SH 274 | 0.24 | 0.18 |
| Comparative 5.2 | Foral 105-E, SH 178 | 0.72 | 0.65 |
| Comparative 5.3 | Kristalex F85, SA 185 | 3.41 | 2.85 |
| Comparative 5.4 | Regalite R 1100, SK 442 | 0.12 | 0.06 |
| Comparative 5.5 | Regalite R 9100, SK 377 | 0.4 | 0.31 |
| Comparative 5.6 | Regalite R 7100, SK 458 | 1.10 | 1.05 |
| Comparative 5.7 | Regalite S 5100, SK 434 | 1.3 | 1.2 |
| Inventive 5.8 | Styrene/Acrylate | 1.86 | |
| Inventive 5.9 | Styrene/Acrylate | 1.0 | |

The data showed relative low absorption for the rosin esters that are already used in combination with UV-curable adhesive compositions, however, these rosin ester products can be rejected in certain medical applications due to perceived skin sensitivity concerns. The Kristalex® aromatic tackifier resin showed a relatively high absorption due to the fact that this product is purely aromatic. The UV absorption for the Regalite® $C_9$ tackifier resins indicated that mainly the degree of aromaticity (varied with the degree of hydrogenation) influenced the absorption. The same result was observed for the two styrene-acrylate tackifier resins. The styrene-acrylate tackifier resin with the highest aromatic content also showed the highest absorption. The absorption of the two styrene-acrylate tackifier resins was somewhat higher than for the rosin esters, but much lower than the Kristalex® aromatic tackifier resin. Other advantages of the styrene-acrylate tackifiers over conventional tackifiers are shown later in the examples, such as, compatibility with UV-curable acrylic compositions, thermal stability, and moisture vapor transport rate.

Example 6

Compatibility of the Tackifier Resins with UV-curable Acrylic Compositions

The compatibility of the various tackifier resins with acResin® 203 UVacrylic copolymer or acResin® 258 UVacrylic copolymer produced by BASF Corporation was determined. The compatibility was studied using a heat bank. The procedure for determining compatibility was previously described at the beginning of the examples section of this disclosure.

TABLE 7

Compatibility Temperature for Various Tackifier Resin/acResin ® UV Acrylic Copolymer Mixtures

| Tackifier resin | acResin UV | Tackifier resin:acResin UV ratio | Compatibility temperature (° C.) |
|---|---|---|---|
| Foral 85-E[1] | acRes-203 UV | 20:80 | <50 |
| Foral 105-E | acRes-203 UV | 20:80 | 135 |
| Kristalex F85[2] | acRes-203 UV | 20:80 | <50 |
| Regalite S5100[3] | acRes-203 UV | 20:80 | >200 |
| Regalite R7100 | acRes-203 UV | 20:80 | >200 |
| Regalite R9100 | acRes-203 UV | 20:80 | >200 |
| Regalite S1100 | acRes-203 UV | 20:80 | >200 |
| Regalite R1100 | acRes-203 UV | 20:80 | >200 |
| Regalite R1125 | acRes-203 UV | 20:80 | >200 |
| Piccotac 6095[4] | acRes-203 UV | 20:80 | >200 |
| Styrene-Acrylate Polymer - Formalation I | acRes-203 UV | 20:80 | <50 |
| Styrene-Acrylate Polymer - Formalation II | acRes-203 UV | 20:80 | >200 |
| Reactol AC 11[5] | acRes-203 UV | 20:80 | <50 |
| Reactol AC 18 | acRes-203 UV | 20:80 | >200 |
| Reactol AC 11 | acRes-258 UV | 20:80 | <50 |
| Reactol AC 18 | acRes-258 UV | 20:80 | >200 |
| Styrene-Acrylate Polymer - Formalation I | acRes-203 UV | 15:85 | <50 |
| Styrene-Acrylate Polymer - Formalation II | acRes-203 UV | 15:85 | >200 |
| Styrene-Acrylate Polymer - Formalation I | acRes-258 UV | 15:85 | <50 |
| Styrene-Acrylate Polymer - Formalation II | acRes-258 UV | 15:85 | <50 |
| Reactol AC 11 | acRes-203 UV | 50:50 | <50 |
| Reactol AC 18 | acRes-203 UV | 15:85 | >200 |
| Reactol AC 11 | acRes-258 UV | 50:50 | <50 |
| Reactol AC 18 | acRes-258 UV | 15:85 | >200 |

[1] Foral ® rosin esters
[2] Kristalex ® aromatic tackifier resins
[3] Regalite ® C₉ tackifier resin
[4] Piccotac ® modified aliphatic hydrocarbon resin produced by Eastman Chemical Company
[5] Reactol ® acrylic resin With respect to compatibility, both Foral® 85-E rosin ester and Kristalex® F85 aromatic resin are compatible in the acRes-203 UV® acrylic polymer. The Regalite® tackifier resins are not compatible in the acResin®203 UV acrylic copolymer. So despite the fact that the Regalite® tackifier resins show less UV absorption at 255 nm, they are less favorable because of this incompatibility. The styrene-acrylate tackifier resins, both Formulation I and II produced in Example 1, are compatible in the acResin® 258 acrylic copolymer. The styrene-acrylate tackifier resin Formulation I in Example 1 is also compatible in the acRes-203 UV® acrylic polymer. However, Formulation II was not compatible. Formulation I showed lower UV absorption than the Kristalex aromatic tackifier resin, is more compatible than Regalite® tackifier resins, and is non-rosin based. Reactol® AC 11 acrylic resin is compatible in both acResin® 203 and 258 acrylic copolymers from BASF. Reactol AC 18 was not compatible in both polymers.

Example 7

Gelling of the Tackifier Resin in the UV-curable Adhesive Composition

Gelling is an important, but undesired effect, which can occur upon heating the tackifier resin alone, or the UV-curable adhesive composition. Gel formation of the styrene-acrylate tackifier resins has been studied. The results are given in Table 8.

TABLE 8

Gel Formation Upon Heating of the Styrene-Acrylate Tackifier Resin Produced in Example 1

|  | acResin 203 UV | | acResin 258 UV | |
|---|---|---|---|---|
| wt % acResin UV | 85 | 85 | 85 | 85 |
| wt % styrene-acrylate tackifier (Formulation I) | 15 | — | 15 | — |
| wt % styrene-acrylate tackifier (Formulation II) | — | 15 | — | 15 |
| gelling after 3 hours at 160° C. | No | No | No | No |
| gelling after 10 hours at 140° C. | Little | yes | No | No |

The styrene-acrylate tackifier resins alone did not form gels at higher temperatures. Both formulations showed gelling in case of acResin® 203 UV acrylic copolymer after 10 hours at 140° C. The use of acResin® 258 UV acrylic copolymer did not result in gelling. Therefore, it can be concluded that the gelling is related to the acResin® acrylic polymer and not to the tackifier resin. The styrene-acrylate tackifier resins are stable enough for the use in these formulations.

Example 8

Thermal Stability of Styrene-Acrylate Tackifier Resins

The thermal stability of the styrene-acrylate tackifier resins produced in Example 1 has been studied. The results are given in Table 9. The styrene-acrylate tackifier resins were heated as specified in Table 9.

TABLE 9

Thermal Stability of Styrene-Acrylate Tackifier Resins Produced in Example 1

|  |  | Styrene-acrylate - Formula I | Styrene-acrylate - Formula II |
|---|---|---|---|
| R&B softening point (° C.) | Initial | 96.3 | 75.7 |
|  | 3 hours at 160° C. | 99.1 | 82.9 |
|  | 10 hours at 140° C. | 99.2 | 83.2 |
| Acid number (mg KOH/g) | Initial | 59 | 117 |
|  | 3 hours at 160° C. | 59 | 119 |
|  | 10 hours at 140° C. | 59 | 118 |

TABLE 9-continued

Thermal Stability of Styrene-Acrylate Tackifier Resins Produced in Example 1

|  |  | Styrene-acrylate - Formula I | Styrene-acrylate - Formula II |
|---|---|---|---|
| Gardner color | Initial | 0.2 | 0.5 |
|  | 3 hours at 160° C. | 0.2 | 0.7 |
|  | 10 hours at 140° C. | 0.3 | 0.8 |
| Molecular weight (Dalton) | initial Mn | 3804 | 2970 |
|  | Mw | 9320 | 7187 |
|  | Mz | 17833 | 14688 |
|  | 3 hours at 160° C. Mn | 3671 | 2928 |
|  | Mw | 9300 | 7299 |
|  | Mz | 17904 | 15348 |
|  | 10 hours at 140° C. Mn | 3718 | 2979 |
|  | Mw | 9300 | 7329 |
|  | Mz | 17833 | 15321 |

The R&B softening point of the styrene-acrylate tackifier resin increased slightly upon heating. All other tackifier resin properties were not influenced by heating under the given circumstances. Therefore, it can be concluded that the styrene-acrylate tackifier resins do not only have good gelling stability but also a good heat stability, despite the fact that no antioxidants were used. The Reactol® AC 11 and AC 18 tackifier resins were also aged upon heating, and both products showed an unstable performance. Initially, Reactol® AC11 and AC18 tackifier resins were liquid, after 24 hours at 175° C., the products were gels. This can be due to trans-esterification reactions. However, at temperatures below about 175° C., Reactor® AC11 and AC 18 tackifier resins function well in UV-curable adhesive compositions and do not gel.

Example 9

Application Tests for UV-Curable Adhesive Compositions

Styrene-acrylate tackifier resins and UV-curable acrylic compositions were dissolved in an isopropyl alcohol/toluene mixture. After being coated on bi-axially oriented polypropylene (BOPP), the solvent mixture was evaporated. This is a solvent coating method. Later in this disclosure, this method is compared to a hotmelt coating method.

Several different tackifier resins were mixed with acResin® 203 UV acrylic copolymer to produce a UV-curable adhesive composition. An 85/15 ratio of acResin® 203 UV acrylic copolymer to tackifier resin was used.

TABLE 10.1

Application Results of Various Tackifier Resins in acResin ® 203 Acrylic Copolymer (15:85) at a Coating Weight of 20 g/m² and a UV-C Dose of 70 mJ/cm²

| Tackifier resin | MDSP (° C.) | Acid number (mg KOH/g) | MMAP (° C.) | Mz (Daltons) | Peel (N/25 mm) | Loop tack (N/25 mm) | SAFT (° C.) | Shear (min) 1 kg 1 cm 40° C. |
|---|---|---|---|---|---|---|---|---|
| No tackifier |  |  |  |  | 3.1 | 5.7 | 135 |  |
| Kristalex F85 | 85 | <1 | 2 | 1850 | 7.6 | 6.0 | 102 | 16.1 |
| Kristalex F100 | 100 | <1 | 3 | 2100 | 7.8 | 12.6 | 112 | 17.1 |
| Kristalex F115 | 115 | <1 | 5 | 3000 | 3.8 | 0.5 | 34 | 1.8 |
| Foral 85-E | 80 | 9 |  |  | 7.3 | 10.4 | 125 | 15.9 |
| Foral 105-E | 100 | 14 |  |  | 7.2 | 11.9 | 106 | 46.6 |
| Foral 120-E | 115 | 15 |  |  | 7.1 | 11 | 114 | 54.9 |
| Styrene-Acrylate - Formulation I | 100 | 60 | 5 | 15000 | 6.8 | 10.6 | 126 | 15.8 |
| Styrene-acrylate - Formulation II | 82 | 110 | 10 | 13400 | 5.8 | 9.8 | 112 | 10.1 |

Table 10.1 shows that the styrene-acrylate tackifier resins produced in Example 1 performed equally to currently used commercial tackifier resins. Only the higher softening point Foral® rosin esters tended to give better shear performance. As stated before, rosin esters may not be favored in certain applications due to adhesive manufacturers' perception that rosin esters can cause skin sensitization.

Table 10.2 summarizes application results of various tackifier resins in acResin® 203 acrylic copolymer at various UV dosages.

TABLE 10.2

Application Results of Various Tackifier Resins
in acResin ® 203 Acrylic Copolymer (20:80)
at a Coating Weight of 20 g/m² and Various UV Dosages

| | | UV-C Dose (mJ/cm²) | | | | |
|---|---|---|---|---|---|---|
| | | 0.0 | 16.2 | 36.5 | 55.4 | 113.6 |
| Foral 85 E Coating weight 23 g/m² | | | | | | |
| Peel Adhesion to steel | avg | 11.8 | 7.0 | 6.4 | 6.4 | 8.0 |
| (N/25 mm) | st dev | (0.3) | (0.2) | (0.5) | (0.2) | (0.8) |
| Loop tack to steel | avg | 13.9 | 9.0 | 8.4 | 9.1 | 12.0 |
| (N/25 mm) | st dev | (1.7) | (0.2) | (0.1) | (0.7) | (1.5) |
| SAFT | avg | 37 | 106 | 114 | 107 | 98 |
| (° C.) | st dev | (0) | (1) | (1) | (0) | (—) |
| Kristalex F85 Coating weight 21 g/m² | | | | | | |
| Peel Adhesion to steel | avg | 11.8 | 7.5 | 7.5 | 8.8 | 8.2 |
| (N/25 mm) | st dev | (1.0) | (0.3) | (1.4) | (0.1) | (1.4) |
| Loop tack to steel | avg | 22.2 | 11.2 | 11.1 | 11.2 | 13.1 |
| (N/25 mm) | st dev | (2.6) | (0.0) | (0.2) | (0.7) | (0.4) |
| SAFT | avg | 35 | 94 | 110 | 111 | 112 |
| (° C.) | st dev | (1) | (6) | (2) | (1) | (5) |
| Styrene-Acrylate (Formulation I) Coating weight 23 g/m² | | | | | | |
| Peel Adhesion to steel | avg | 24.6 | 9.5 | 7.9 | 7.9 | 8.0 |
| (N/25 mm) | st dev | — | (0.2) | (0.1) | (0.2) | (0.4) |
| Loop tack to steel | avg | 18.5 | 16.4 | 12.9 | 13.4 | 13.0 |
| (N/25 mm) | st dev | (0.1) | (0.1) | (0.8) | (0.0) | (0.1) |
| SAFT | avg | 43 | 97 | 124 | 130 | 135 |
| (° C.) | st dev | (1) | (4) | (1) | (6) | (4) |
| Styrene-Acrylate (Formlation II) Coating weight 20 g/m² | | | | | | |
| Peel Adhesion to steel | avg | 16.3 | 8.2 | 8.4 | 7.9 | 8.1 |
| (N/25 mm) | st dev | (0.1) cf | (0.4) | (0.5) | (0.9) | (0.3) |
| Loop tack to steel | avg | 18.1 | 10.9 | 10.6 | 10.4 | 9.9 |
| (N/25 mm) | st dev | (0.0) | (0.1) | (0.6) | (0.0) | (1.2) |
| SAFT | avg | 39 | 107 | 123 | 123 | 123 |
| (° C.) | st dev | (1) | (2) | (0) | (0) | (2) |
| BASF AcResinA203UV Coating weight 20 g/m² | | | | | | |
| Peel Adhesion to steel | avg | 9.6 | 5.3 | 4.1 | 4.1 | 3.8 |
| (N/25 mm) | st dev | (1.0) cf¹ | (0.2) | (0.1) | (0.2) | (0.2) |
| Loop tack to steel | avg | 27.8 | 8.3 | 8.7 | 7.8 | 7.2 |
| (N/25 mm) | st dev | (0.4) | (0.4) | (0.0) | (0.2) | (0.3) |
| SAFT | avg | 35 | 150 | 152 | 149 | 148 |
| (° C.) | st dev | (0) | (2) | (0) | (0) | (2) |

¹CF—Cohesive Failure - adhesive residue left on test panel.

Figure 7:
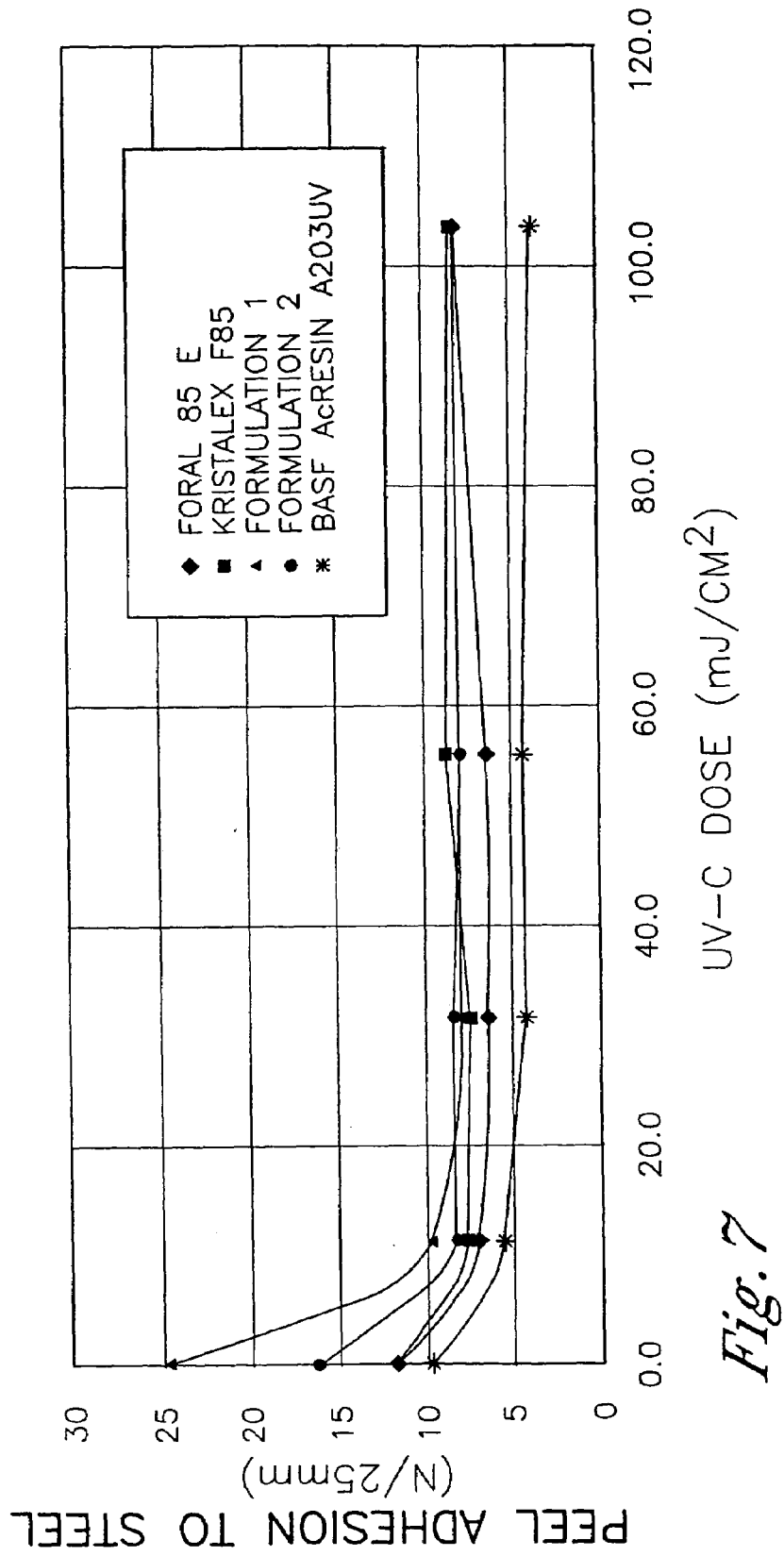
FIG. 7 is a plot of peel adhesion versus the UV dose of several UV-curable adhesive compositions containing acResin® 203 acrylic copolymer with several different tackifier resins.
Figure 8:
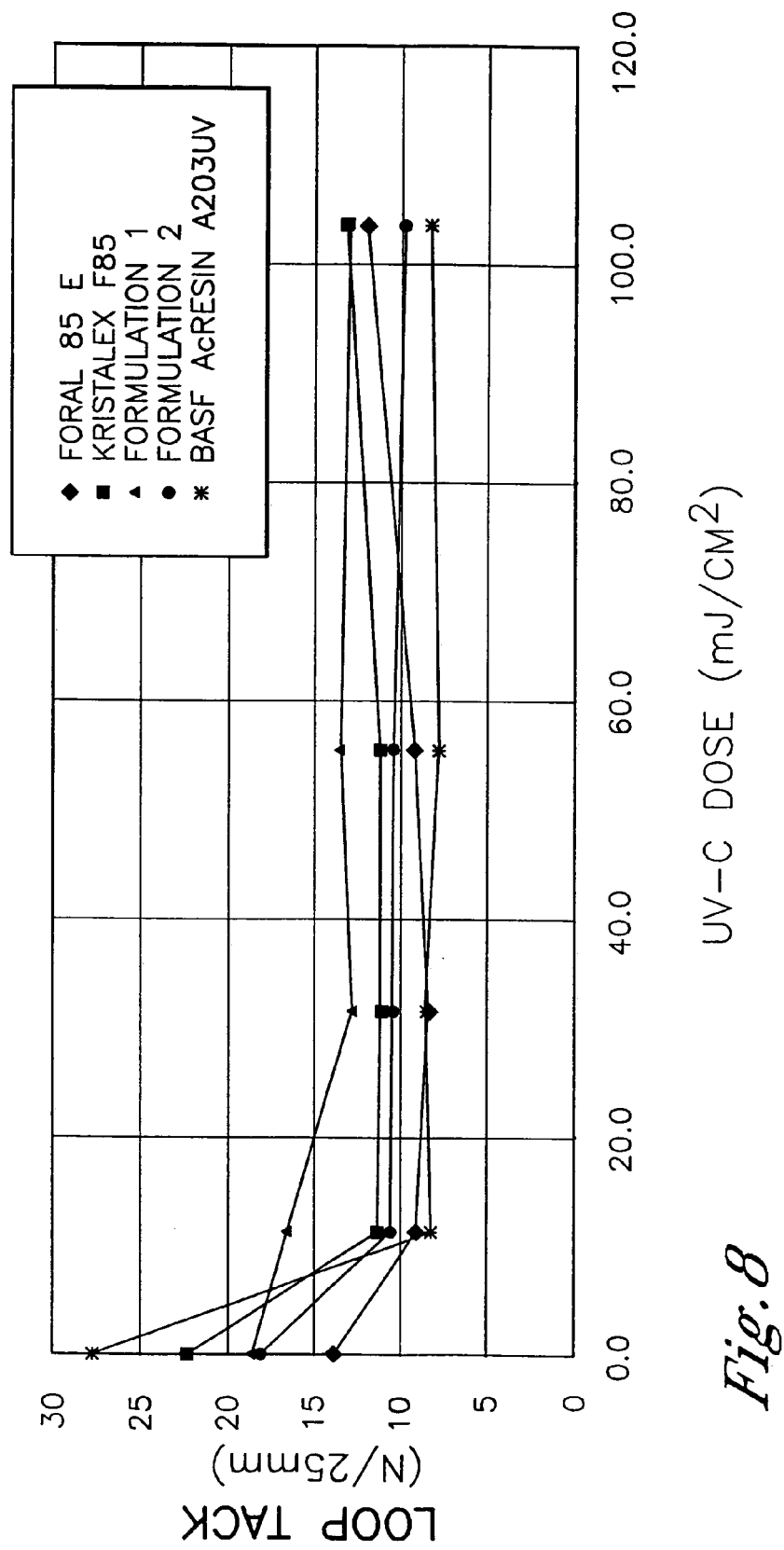
FIG. 8 is a plot of the loop tack versus UV dose of several UV-curable adhesive compositions containing acResin® 203 acrylic copolymer with several different tackifier resins.
Figure 9:
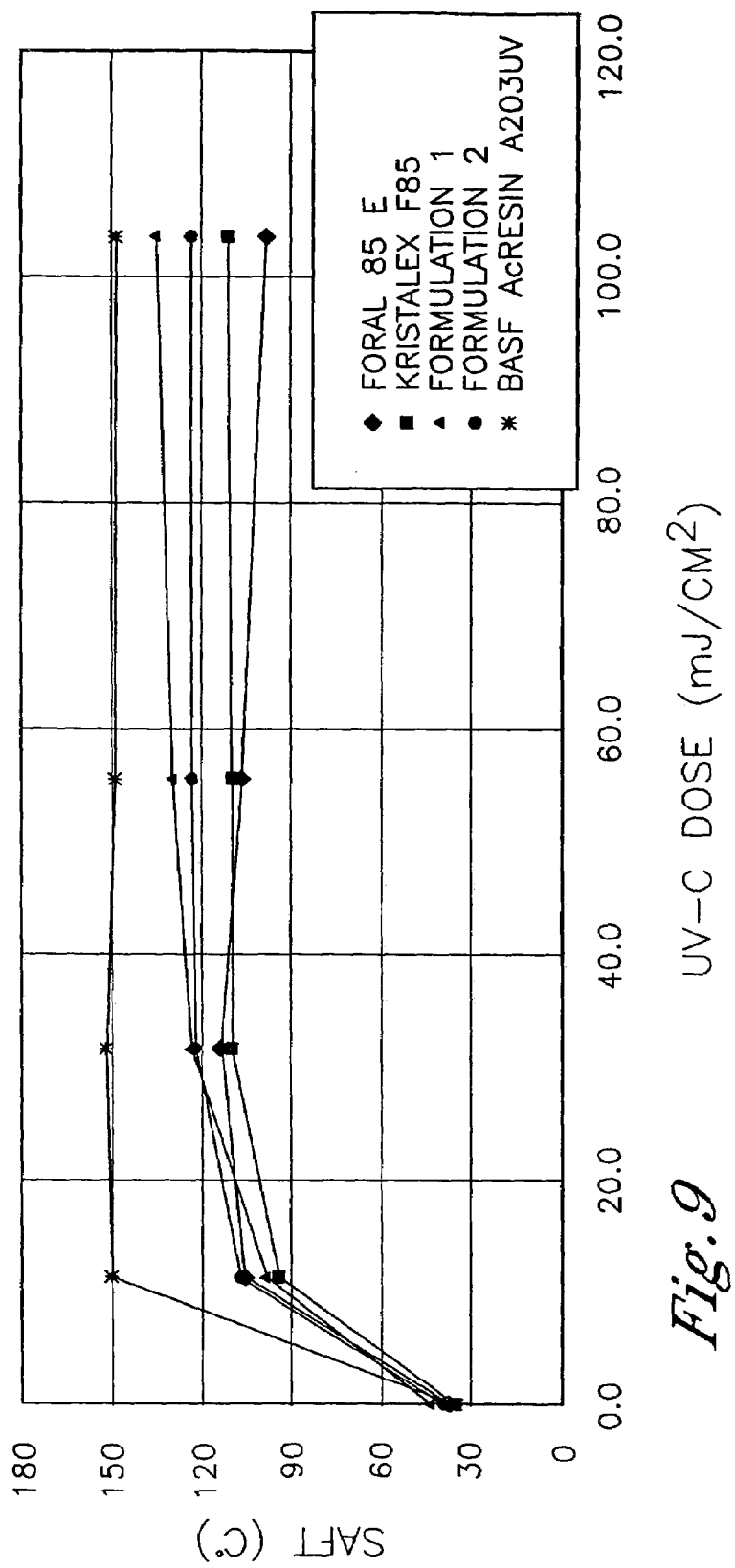
FIG. 9 is a plot of the SAFT versus UV dose of several UV-curable adhesive compositions containing acResin® 203 acrylic copolymer with several different tackifier resins.
Figure 10:
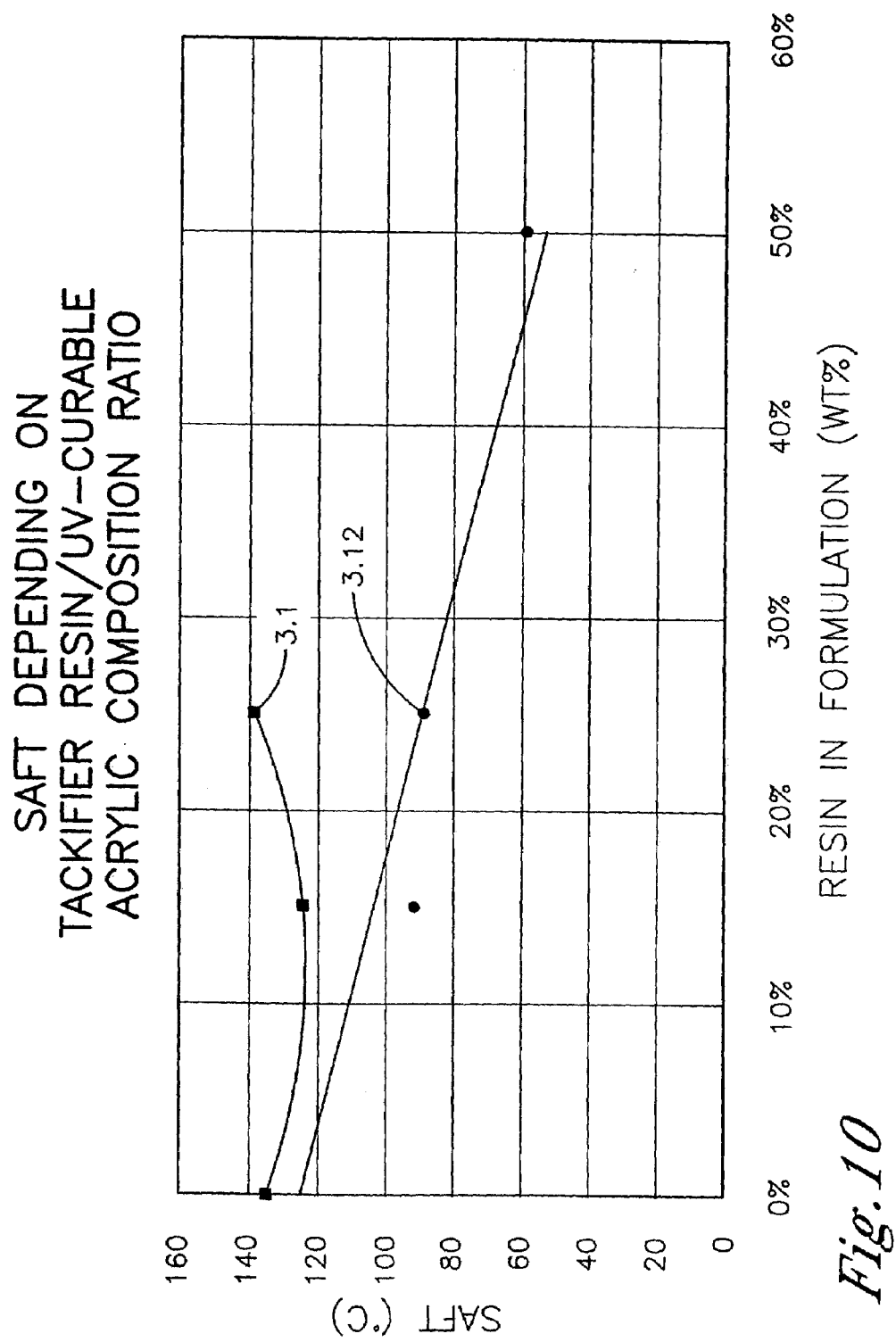
FIG. 10 is a plot showing the SAFT as a result of the amount of tackifier resin contained in the UV-curable adhesive composition.
Figure 11:
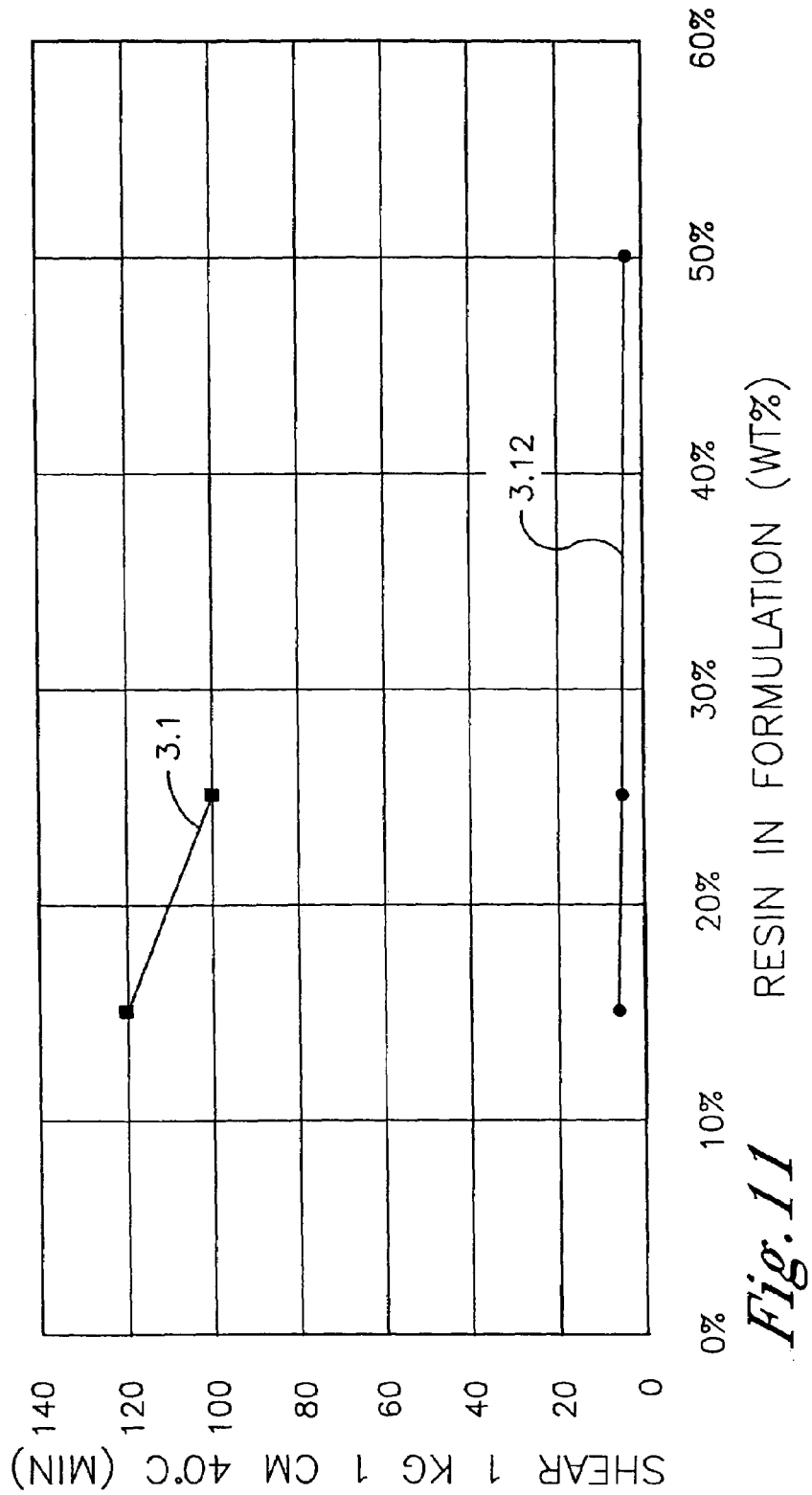
FIG. 11 is a plot showing the shear as a result of the amount of tackifier resin contained in the UV-curable adhesive composition.
Figure 12:
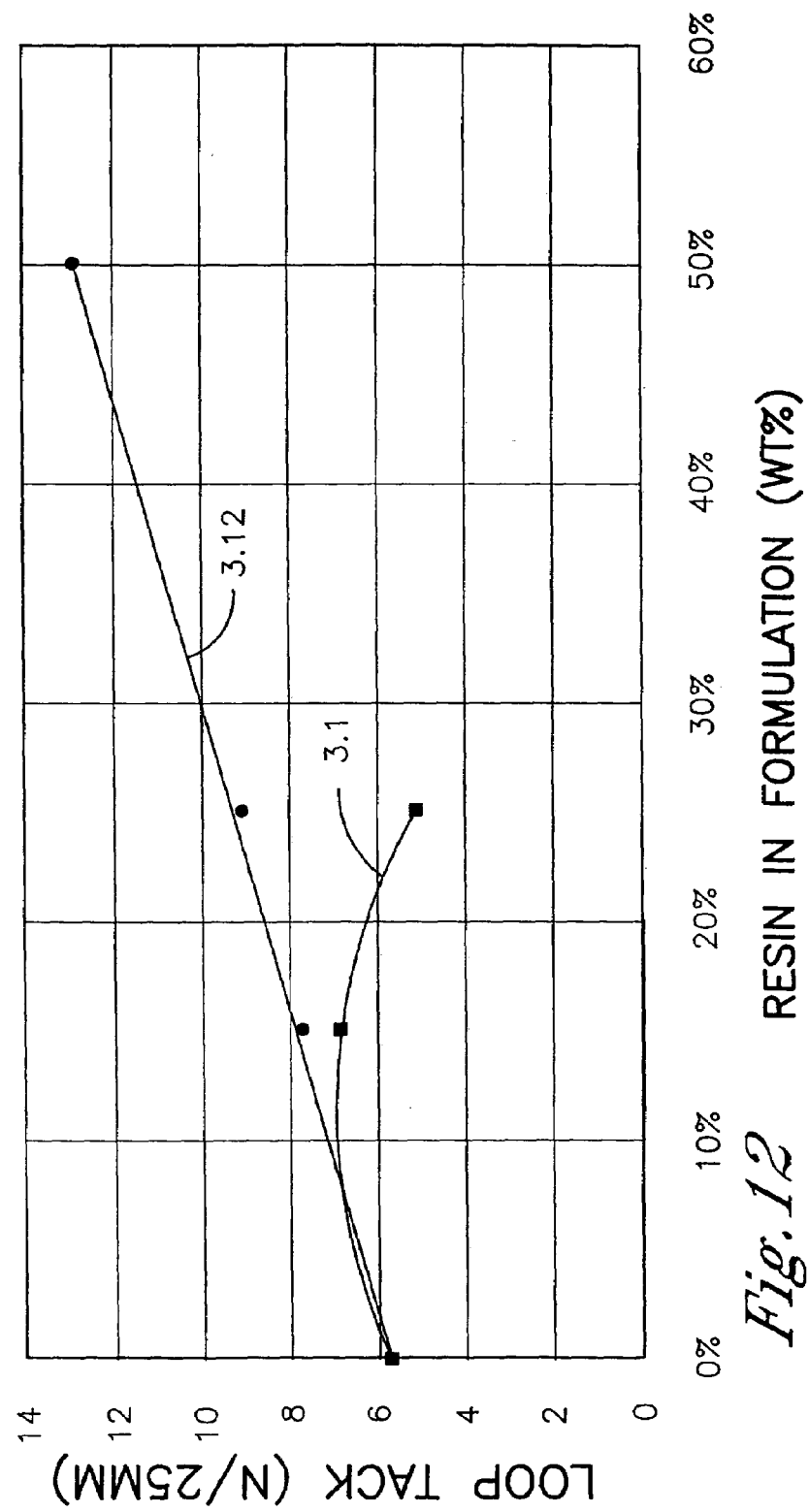
FIG. 12 is a plot showing the loop tack as a result of the amount of tackifier resin contained in the UV-curable adhesive composition.
Figure 13:
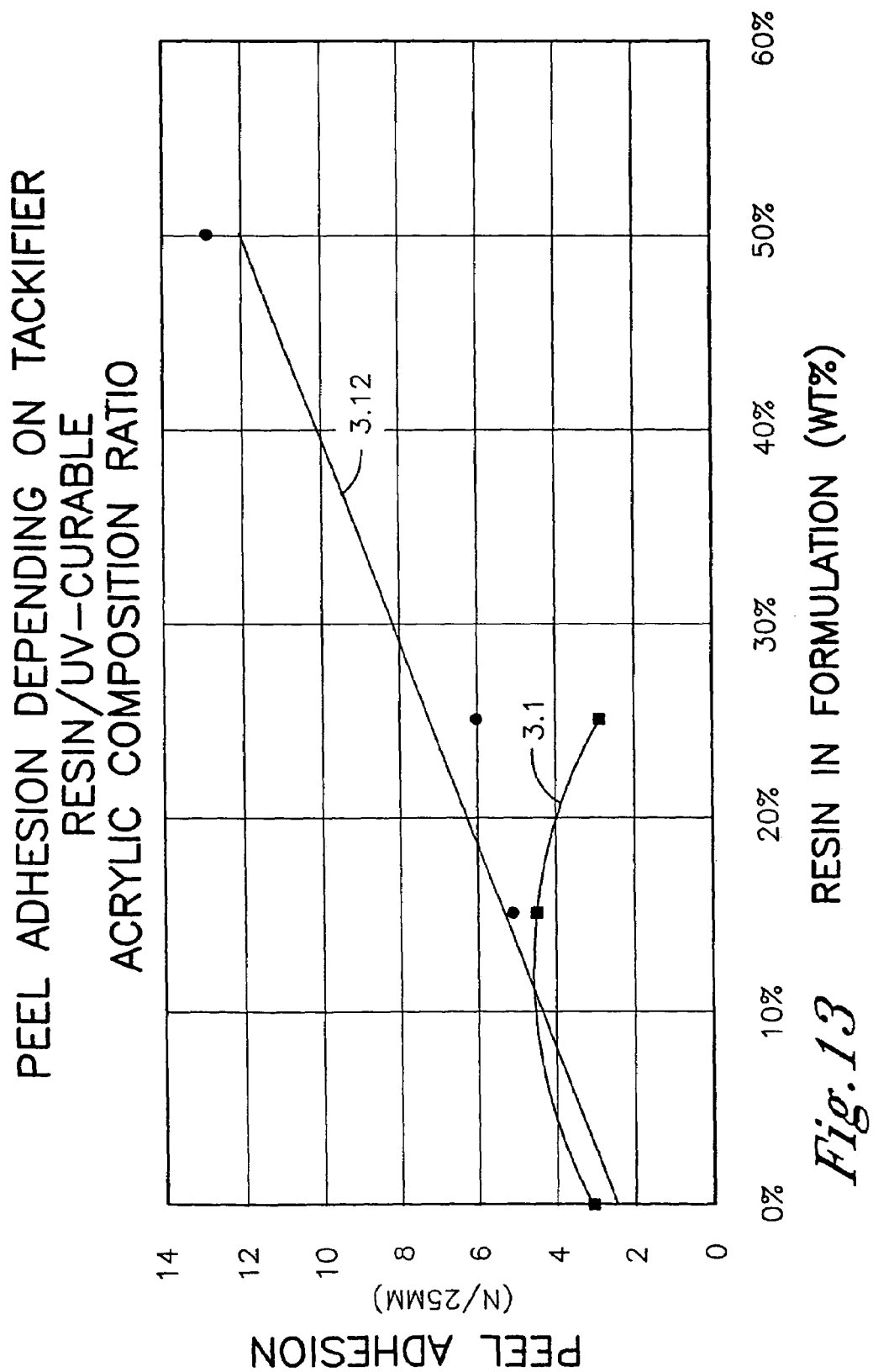
FIG. 13 is a plot showing the peel adhesion as a result of the amount of tackifier resin contained in the UV-curable adhesive composition.
Figure 14:
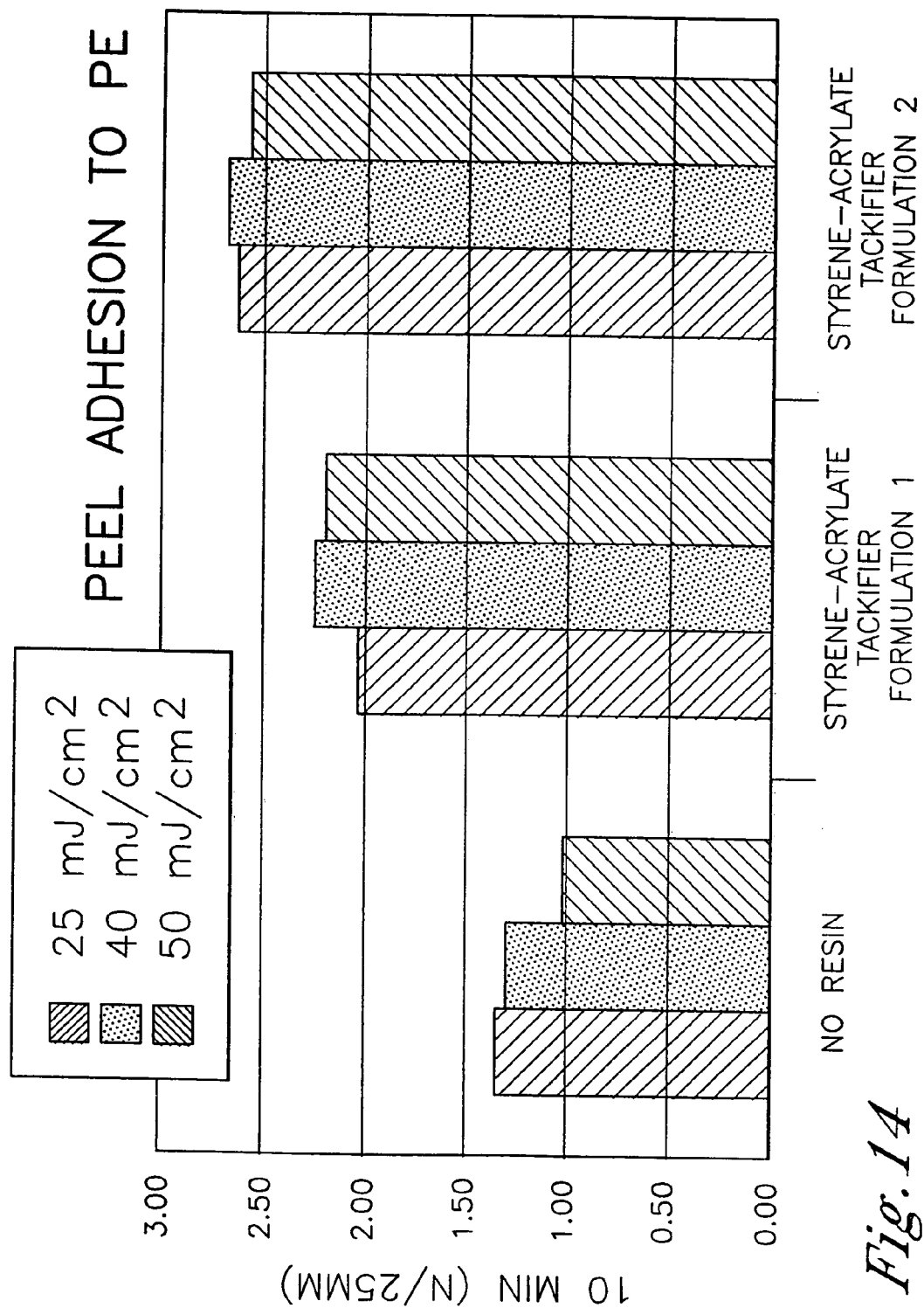
FIG. 14 is a plot of the peel adhesion to polyethylene versus the UV dose of several UV-curable adhesive compositions containing acResin® 258 acrylic copolymer with several different tackifier resins.
Figure 15:
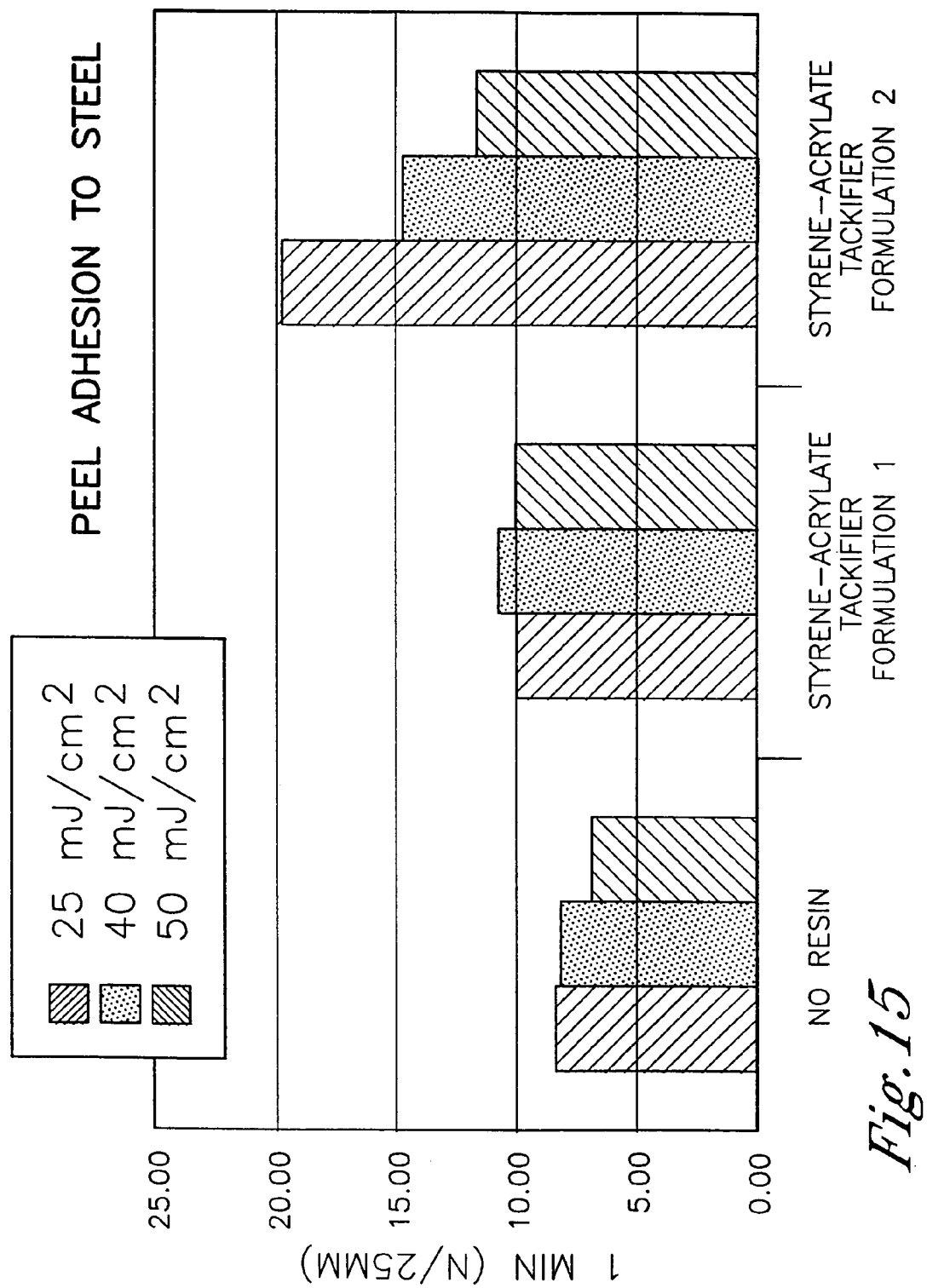
FIG. 15 is a plot of the peel adhesion to steel versus UV dose of several UV-curable adhesive compositions containing acResin® 258 acrylic copolymer with several different tackifier resins.
Figure 16:
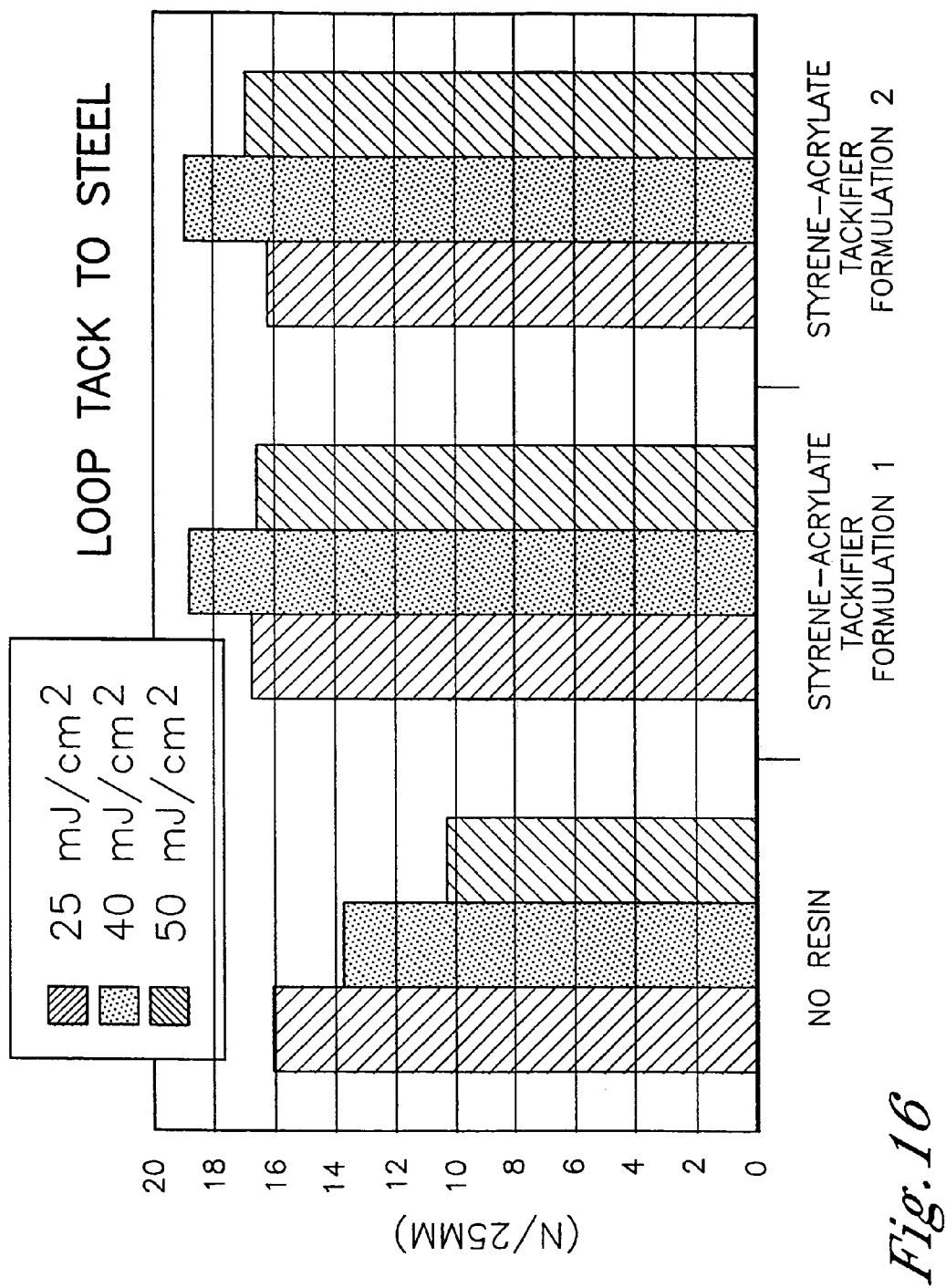
FIG. 16 is a plot of the loop tack to steel versus UV dose of several UV-curable adhesive compositions containing acResin® 258 acrylic copolymer with several different tackifier resins.
Figure 17:
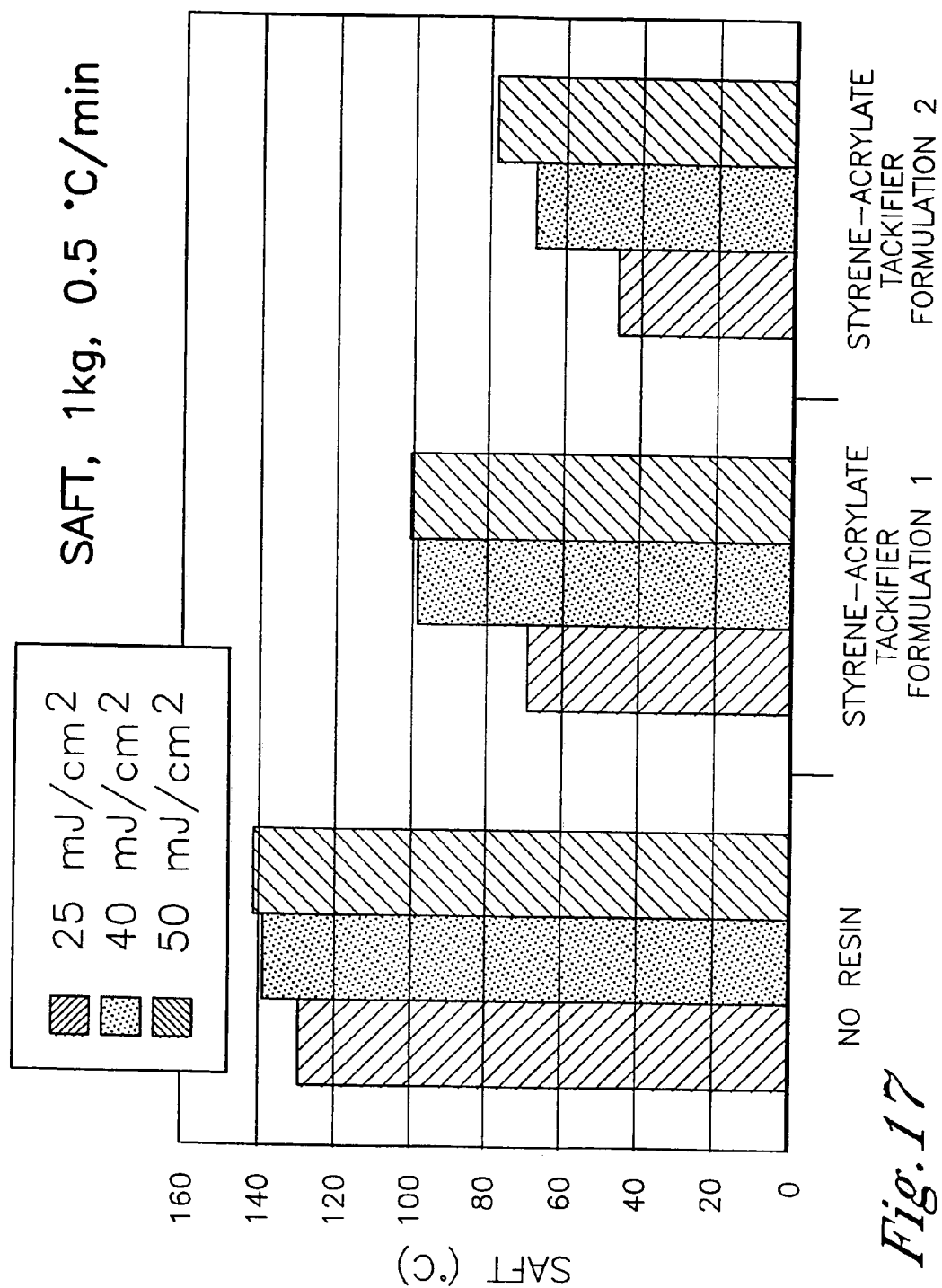
FIG. 17 is a plot of the SAFT versus UV dose of several UV-curable adhesive compositions containing acResin® 258 acrylic copolymer with several different tackifier resins.

The results are also presented in FIGS. 7, 8, and 9.

FIG. 7 clearly shows that the peel decreased as the UV dose increased, but in all cases, when a tackifier was used, the peel values were better than the UV-curable acrylic copolymer alone. The styrene-acrylate tackifier resins produced in Example 1 performed as well as the conventional tackifiers (Foral 85-E and Kristalex 85).

FIG. 8 clearly shows that the loop tack also decreased as a function of UV-dose, but in all cases when a tackifier was used, the looktack was better than the UV-curable acrylic copolymer alone. Without curing, the loop tack of the UV-curable acrylic composition (acResin® A203UV acrylic copolymer) was higher than the UV-curable adhesive composition containing the tackifier resin. After curing, loop tack of the inventive UV-curable adhesive composition was improved. The styrene-acrylate tackifier resin, formulation I, performed as well as conventional tackifiers, such as Foral 85-E® rosin ester and Kristalex F85® aromatic polymer.

FIG. 9 clearly shows that SAFT increased as a function of UV dose. This further illustrates the advantage of the styrene-acrylate tackifier resins. The SAFT values at higher UV-C dosages for the styrene-acrylate tackifier resins are clearly much better than for the conventional tackifiers, such as, Foral 85-E® rosin ester and Kristalex F85® aromatic polymer. With the styrene-acrylate tackifier of Formulation I in Example 1, the SAFT even became very close to the UV-curable acrylic composition at high curing dosages. Examples presented later in this disclosure show that further optimization of the tackifier resin can result in a further improvement of the SAFT, while peel and loop tack are improved over other systems.

Example 10

Application Tests for Styrene-Acrylate Tackifier
Resins Produced in Example 3

The tackifier resins produced in Example 3 (see Table 5) varying the feed composition were also evaluated. In Table 11, UV-curable adhesive compositions were produced containing a ratio of 85:15 acRes® 203UV acrylic copolymer to tackifier resin.

TABLE 11

Application Results of Various Tackifier Resins in acResin ® 203 Acrylic Copolymer (15:85) at a Coating Weight of 20 g/m² and a UV-C dose of 70 mJ/cm²

| Tackifier Resin Produced in Ex. 3 | MDSP (° C.) | Acid number (mg KOH/G) | MMAP (° C.) | Mz (Dalton) | Peel (N/25 mm) | Loop tack (N/25 mm) | SAFT (° C.) | Shear (min) 1 kg 1 cm 40° C. | Compatibility (20% resin) |
|---|---|---|---|---|---|---|---|---|---|
| No resin | | | | | 3.1 | 5.7 | 135 | — | |
| 3.1 | 44.9 | 39 | 6 | 15921 | 4.6 | 9.0 | 89 | 5.8 | 86 |
| 3.2 | 84.4 | 112 | 7 | 21198 | 4.8 | 6.5 | 121 | 6.3 | 168 |
| 3.3 | 114.9 | 187 | 15 | 18976 | 3.8 | 6.0 | 133 | 10.2 | 184 |
| 3.4 | 95.9 | 88 | 4 | 23766 | 6.0 | 9.4 | 100 | 12.5 | 160 |
| 3.5 | 112.9 | 130 | 16 | 27459 | 5.9 | 7.7 | 133 | 58.7 | 196 |
| 3.6 | 76.2 | 35 | -2 | 23896 | 6.0 | 6.0 | 135 | 10.5 | <50 |
| 3.7 | 141.2 | 172 | 32 | 52090 | 4.7 | 6.7 | 126 | 108 | >200 |
| 3.8 | 116.4 | 87 | 15 | 27649 | 5.1 | 9.2 | 141 | 21.8 | 188 |
| 3.9 | 142.7 | 141 | 31 | 32181 | 5.8 | 8.7 | 123 | 137.5 | >200 |
| 3.10 | 108.5 | 37 | 11 | 25842 | 5.6 | 9.2 | 116 | 12.6 | <50 |
| 3.11 | 141.4 | 110 | 27 | 28915 | 5.9 | 8.2 | 129 | 107 | >200 |
| 3.12 | 171.2 | 149 | 44 | 51019 | 4.5 | 6.8 | 124 | 120 | >200 |

The adhesive tests were performed at 15% by weight tackifier resin in the UV-curable adhesive composition, and the compatibility was measured at 20% by weight tackifier resin. This is because a higher resin content results in clear compatibility differences and makes the differences between the tackifier resins in Table 11 more clear.

The results in Table 11 clearly show that adhesive performance can be easily controlled using MDSP, acid number, MMAP and Mz. The shear values easily can be increased by using more acid monomer in the tackifier resin formulation. Softening point has a clear effect on SAFT value. The data also show that with varying the acid number, MDSP, MMAP and Mz, an adhesive performance can be obtained with much better properties than for example with the Kristalex® aromatic resin and Foral® rosin ester products. For the tackifier resin in run 3.8, higher SAFT values were obtained while peel and loop tack were clearly increased to comparable levels of Foral 85-E® rosin ester (see Table 10.1). The SAFT value for the tackifier resin in run 3.8 was even as high as the acResin® 203UV acrylic copolymer alone.

Example 11

Varying Amounts of Tackifier Resin in UV-Curable Adhesive Composition

Besides the tackifier resin properties, the UV-curable adhesive composition formulation can also be used as an additional tool to optimize final adhesive behavior. Two tackifier resins produced in Example 3 (Runs 3.1 and 3.12) were tested in varying amounts in an UV-curable adhesive composition containing acResin®203 UV acrylic copolymer.

TABLE 12

Application Results of Various Tackifier Resins in acResin ® 203 UV Acrylic Copolymer at a Coating Weight of 20 g/m² and a UV-C dose of 70 mJ/cm²

| Tackifier Resin (Produced in Ex. 3) | % tackifier resin in formulation | Peel (N/25 mm) | Loop tack (N/25 mm) | SAFT (° C.) | Shear (min) 1 kg 1 cm 40° C. |
|---|---|---|---|---|---|
| 3.1 | 0 | 3.1 | 5.7 | 135 | — |
| | 15 | 5.2 | 7.6 | 92 | 6.5 |
| | 25 | 6.0 | 9.1 | 88 | 5.7 |
| | 50 | 12.8 | 12.8 | 59 | 4.2 |
| 3.12 | 0 | 3.1 | 5.7 | 135 | — |
| | 15 | 4.5 | 6.8 | 124 | 120 |
| | 25 | 2.8 | 5.1 | 138 | 100 |

The trends are given in FIGS. 10–13.

FIGS. 10–13 show clearly that the effects on the UV-curable acrylic compositions depend on the ratio of tackifier resin to UV-curable acrylic composition and on the tackifier resin properties. With a low softening point resin (Example 3.1), more tackifier resin resulted in a better tack (higher peel and loop tack), but also in lower cohesion (SAFT and Shear). Higher softening point tackifier resin had an optimum on loop tack (above 15% adhesion decreased, probably because adhesive becomes too hard), but more advantages were observed in cohesion (SAFT and Shear). The optimum was caused by the fact that more tackifier resin increased tack, but due to the higher softening point of the tackifier resin, the formulations containing higher tackifier resin loading became to hard (to viscous to give good wetting and time to adhere) so that with more tackifier resin, no further increase of tack was observed, and even a decrease was observed.

The data further indicate that a less compatible tackifier resin (Example 3.12) resulted in a different trend as a function of tackifier resin percentage and showed less increase of adhesion and less decrease of cohesion after the optimum had been reach. In case of Run 3.12, the optimum appeared to be at 10% tackifier resin loading. In case of Run 3.1, the trends were linear with the concentration. Better peel and loop tack, while less shear and SAFT were found. Because SAFT is related to the softening point of the tackifier resin, the most optimal tackifier resin needs to have good compatibility and have a reasonably high softening point. Good examples of such tackifier resins having optimal properties are the styrene-acrylate tackifier resin produced in Example 1 (Formulation I), Example 3.6, and 3.10, and somewhat less in Example 1 (Formulation II). Acid number should not be too high and MMAP should be as low as possible (as much as possible of styrene in the feed, preferably more than 45 wt %).

Example 12

Application Tests of Styrene-Acrylate Tackifier Resin Produced in Example 1 with acResin® A258 UV Acrylic Polymer The two styrene-acrylate tackifier resins produced in Example 1 were also evaluated in a second UV-curable acrylic composition using acResin® A258UV acrylic copolymer at different coating weights, tackifier resin/UV-curable acrylic composition ratios, and UV-C dosages. In Table 13, a ratio of 85:15 acResin® UV acrylic copolymer to tackifier resin was utilized.

TABLE 13

Application Results of Various Styrene-Acrylate Tackifier Resins with two UV-Curable Acrylic Copolymers (15:85) at a Coating Weight of 30 g/m$^2$ and a UV-C Dose of 25 mJ/cm$^2$

|  | Peel Adhesion to Steel | | Peel Adhesion to PE | Loop tack to steel | SAFT |
|---|---|---|---|---|---|
|  | 1 min (N/25 mm) | 10 min (N/25 mm) | 10 min (N/25 mm) | (N/25 mm) | (° C.) |
| AcResin A203 UV | 5.3 | 6.1 | 1.47 | 9.26 | 138 |
| AcResin A203UV + Styrene-acrylate Tackifier (Formula I) | 8.78 | 9.88 | 2.56 | 14.52 | 114 |
| AcResin A203UV + Styrene-acrylate Tackifier (Formula II) | 7.16 | 8.44 | 2.03 | 13.41 | 105 |
| AcResin A258 UV | 8.10 | 8.81 | 1.84 | 12.64 | 143 |
| AcResin A258UV + Styrene-acrylate Tackifier (Formula I) | 10.73 | 11.40 | 2.69 LSS[1] | 15.37 | 72 |
| AcResin A258UV + Styrene-acrylate Tackifier (Formula II) | 11.75 | 17.26 | 1.24 SS[2] | 17.83 | 86 |

[1]Low Slip Stick (LSS)
[2]Slip Stick (SS) - irregular release of the adhesive

A 20% increase of the property values of the UV-curable acrylic compositions is desirable after addition of the tackifier resins. The 1 minute peel adhesion and loop tack are of special interest. Notice the increase in these properties. In case of both acResin® UV acrylic copolymers, this increase was obtained for styrene-acrylate tackfier resin produced in Example 1, despite the fact that Formlation II was found to be less compatible in acResin® 203 UV acrylic copolymer (see Table 9).

For Table 14, a UV-curable adhesive composition was made with an acResin UV/tackifier ratio of 85/15. In this case, coating weight was increased compared with Table 13.

TABLE 14

Application Results of Various Resins in acResin ® 258 (15:85) at a Coating Weight of 70 g/m² and a UV-C Dose of 25 mJ/cm²

| | Peel Adhesion to Steel | | Peel Adhesion to PE | Loop tack to steel | SAFT |
|---|---|---|---|---|---|
| | 1 min (N/25 mm) | 10 min (N/25 mm) | 10 min (N/25 mm) | (N/25 mm) | (° C.) |
| AcResin A203 UV | 6.73 | 7.53 | 2.15 | 15.82 | 104 |
| AcResin A203UV + Styrene-acrylate Tackifier (Formula I) | 12.78 | 16.88 | 3.87 | 23.09 | 49 |
| AcResin A203UV + Styrene-acrylate Tackifier (Formula II) | 10.90 | 13.55 | 3.41 | 17.49 | 50 |
| AcResin A258 UV | 10.73 | 13.37 | 2.34 | 20.27 | 129 |
| AcResin A258UV + Styrene-acrylate Tackifier (Formula I) | 29.74 CF[1] | 31.42 CF | 3.78 SS | 27.44 | 41 |
| AcResin A258UV + Styrene-acrylate Tackifier (Formula I) | 25.81 CF | 25.03 CF | 2.91 SS | 25.15 | 44 |

[1]Cohesion Failure - release of the adhesive from the substrate (BOPP)
[2]Slip Stick - irregular release of the adhesive Again, the use of tackifier resins with the acResin® 258 acrylic copolymer showed a significant increase in peel adhesion and loop tack. Due to the higher coating weight, the drop in SAFT was higher. Due to the higher coating weights, however, peel adhesion and loop tack were improved at 30 g/m². The results showed cohesion failure and slip stick for the peel adhesion to steel (both 1 min and 10 min) and peel adhesion to PE. This was not observed for the 30 g/m² coatings of BASF acResin® A258 UV acrylic copolymer in combination with the tackifier resins in Table 14.

Experiments were also carried out at the coating weight of 30 g/m², but now with a higher UV-C dose. For Table 15, a UV-curable adhesive composition was used with an acResin® UV acrylic copolymer/tackifier ratio of 85/15.

TABLE 15

Application Results of Styrene-Acrylate Tackifier Resin in acResin ® 258 Acrylic Copolymer (15:85) at a Coating Weight of 30 g/m² and a UV-C Dose of 50 mJ/cm²

| | Peel Adhesion to Steel | | Peel Adhesion to PE | Loop tack to steel | SAFT |
|---|---|---|---|---|---|
| | 1 min (N/25 mm) | 10 min (N/25 mm) | 10 min (N/25 mm) | (N/25 mm) | (° C.) |
| AcResin A258 UV | 6.7 | 6.87 | 2.04 | 10.3 | 120 |
| AcResin A258UV + Styrene-acrylate Tackifier (Formula I) | 8.27 | 9.76 | 3.97 LSS | 13.76 | 93 |
| AcResin A258UV + Styrene-acrylate Tackifier (Formula II) | 9.76 | 11.17 | 3.84 LSS | 12.73 | 88 |

At a higher UV-C dose, lower peel adhesion, loop tack, and SAFT were observed, but the desired effect of the tackifier resin to increase peel adhesion and loop tack was still observable.

In Table 16, a UV-curable adhesive composition has been used with an acResin® UV acrylic copolymer/tackifier resin ratio of 90/10.

TABLE 16

Application Results of Styrene-Acrylate Tackifier Resins in acResin® 258 (10:90) at a Coating Weight of 30 g/m² and a UV-C Dose of 50 mJ/cm²

| | Peel Adhesion to Steel | | Peel Adhesion to PE | Loop tack to | |
|---|---|---|---|---|---|
| | 1 min (N/25 mm) | 10 min (N/25 mm) | 10 min (N/25 mm) | steel (N/25 mm) | SAFT (° C.) |
| AcResin A258 UV | 6.7 | 6.87 | 2.04 | 10.3 | 120 |
| AcResin A258UV + Styrene-acrylate Tackifier (Formulation I) | 7.65 | 7.84 | 1.90 SS | 12.31 | 116 |
| AcResin A258UV + Styrene-acrylate Tackifier (Formulation II) | 6.7 | 9.96 | 3.11 | 10.75 | 97 |

At lower amounts of tackifier resin, an increase of peel and loop tack still was observed when using styrene-acrylate tackifier resin (Formulation I), and the SAFT value did not decrease dramatically. The results in Tables 13–16 show that by using the inventive tackifier resin, the performance of the UV-curable adhesive composition can be controlled with coating weight, UV-C dose, tackifier resin choice and tackifier resin/UV-curable acrylic composition ratio.

Example 13

Solvent Coating Method Versus Hotmelt Coating Method

To provide a comparison with the solvent coating method of the UV-curable adhesive composition, the following hotmelt coating experiments were conducted. The following procedure was used in the hotmelt coating method. The UV-curable acrylic polymer and tackifier resin were mixed together in an aluminium tray on a hot-plate at higher temperatures (150° C.) to produce a UV-curable adhesive composition. After the mixing, the UV-curable adhesive composition was poured in a LC 200 pilot-plant-scale Lab-coater and coated onto 200 mm large bi-axially oriented polypropylene (BOPP) film at about an average 7 m/minute coating speed at 140° C. The coating speed depended on the viscosity of the UV-curable adhesive composition, therefore, 7 m/minute was the average.

The first experiments were conducted with the Foral® rosin esters as the tackifier resin.

TABLE 17

Application Results of Various Foral® Rosin Esters in acResin® 258 Acrylic Copolymer (5:95) at a Coating Weight of 30 g/m² and a UV-C Dose of 30 mJ/cm²

| | Peel Adhesion to Steel 1 min (N/25 mm) | | Peel Adhesion to PE 10 min (N/25 mm) | | Loop tack to steel (N/25 mm) | | SAFT, 1 kg 0.5° C./min (° C.) | |
|---|---|---|---|---|---|---|---|---|
| | Solvent | Hotmelt | Solvent | Hotmelt | Solvent | Hotmelt | Solvent | Hotmelt |
| Foral 85-E | 10.2 | 8.8 | 3.6 | 4.6 | 12.5 | 16.8 | 64 | 93 |
| Foral 105-E | 9.7 | 9.1 | 4.2 | 4.9 | 13.6 | 13.5 | 64 | 98 |
| Foral 120-E | 10.3 | 9.2 | 4.4 | 4.5 | 13.0 | 16.6 | 62 | 92 |

The results in Table 17 showed no large differences between the two coating methods for peel adhesion to steel and to PE. Loop tack and SAFT appeared to be higher for the hotmelt coating method. At these tackifier resin concentrations and coating conditions, no large differences between the three Foral® rosin esters were found. At 15% rosin ester in the acResin® 203 UV acrylic copolymer, larger differences were found (see Table 10.1), but in both cases, no clear trend with softening point was observed.

Another comparison between the two methods was made in the acResin® 258 UV copolymer and at a higher resin loading (see also Table 12).

TABLE 18

Application Results of Various Styrene-Acrylate Tackifier Resins with acResin ® 258 Acrylic Copolymer (15:85) at a Coating Weight of 30 g/m$^2$ and a UV-C Dose of 25 mJ/cm$^2$

| | Peel Adhesion to Steel 1 min (N/25 mm) | | Peel Adhesion to PE 10 min (N/25 mm) | | Loop tack to steel (N/25 mm) | | SAFT, 1 kg 0.5° C./min (° C.) | |
|---|---|---|---|---|---|---|---|---|
| | Solvent | Hotmelt | Solvent | Hotmelt | Solvent | Hotmelt | Solvent | Hotmelt |
| No tackifier resin | 8.1 | 8.4 | 1.84 | 1.36 | 12.64 | 14.2 | 143 | 128 |
| Styrene-acrylate Tackifier (Formulation I) | 10.7 | 10.3 | 2.7 LSS[1] | 2.1 | 15.37 | 18.2 | 72 | 69 |
| Styrene-acrylate Tackifier (Formulation II) | 11.8 | 19.8 CF | 1.24 SS[2] | 2.6 | 17.83 | 16.2 | 86 | 46 |

[1]LSS - low slip-stick
[2]SS - slip stick

In case of no tackifier resin, only minor differences were found between the solvent and the hotmelt coating methods. Slightly higher SAFT and peel adhesion to PE were found. In case of solvent coating, a decrease of peel adhesion to PE was found, while with hotmelt coating, the desired and expected increase was observed. Depending on the cohesion and adhesion requirements of the UV-curable adhesive composition, the choice of tackifier resin type can have a large influence.

Another comparison was made at UV-C dose of 50 mJ/cm$^2$ (see also Table 15).

At 50 mJ/cm$^2$, the differences between the effects of tackifier resin type were not observed. The same trends were found with respect to the effect of the tackifier resin by solvent coating and hotmelt coating. In this example, however, higher SAFT values were found for hotmelt coating with a UV-C dose of 50 mJ/cm$^2$ compared to SAFT values of hotmelts with a UV-C dose of 25 mJ/cm$^2$. The differences in SAFT as a function of curing is much larger with the hotmelt coating than with the solvent coating.

The effect of the UV-dose for hotmelt coating was also investigated further in the next experiments.

TABLE 19

Application Results of Various Styrene-Acrylate Tackifier Resins with acResin ® 258 Acrylic Copolymer (15:85) at a Coating Weight of 30 g/m$^2$ and a UV-C Dose of 50 mJ/cm$^2$

| | Peel Adhesion to Steel 1 min (N/25 mm) | | Peel Adhesion to PE 10 min (N/25 mm) | | Loop tack to Steel (N/25 mm) | | SAFT, 1 kg 0.5° C./min (° C.) | |
|---|---|---|---|---|---|---|---|---|
| | Solvent | Hotmelt | Solvent | Hotmelt | Solvent | Hotmelt | Solvent | Hotmelt |
| No resin | 6.7 | 6.94 | 2.04 | 1.01 | 10.3 | 12.91 | 120 | 141 |
| Styrene-acrylate Tackifier (Formulation I) | 8.27 | 9.09 | 3.97 LSS[1] | 2.20 | 13.76 | 16.54 | 93 | 100 |
| Styrene-acrylate Tackifier (Formulation II) | 9.76 | 11.75 | 3.84 LSS | 2.59 | 12.73 | 16.38 | 88 | 78 |

[1]LSS - low slip-stick

TABLE 20

Application Results of Various Styrene-Acrylate
Tackifier Resins in acResin 258 ® Acrylic Copolymer (15:85)
at a Coating Weight of 30 g/m² and at Various UV-C Dosages

| UV-dose | Peel Adhesion to Steel 1 min (N/25 mm) | | | Peel Adhesion to PE 10 min (N/25 mm) | | | Loop tack to steel (N/25 mm) | | | SAFT, 1 kg 0.5° C./min (° C.) | | |
|---|---|---|---|---|---|---|---|---|---|---|---|---|
| mJ/cm² | 25 | 40 | 50 | 25 | 40 | 50 | 25 | 40 | 50 | 25 | 40 | 50 |
| No resin | 8.41 | 8.02 | 6.94 | 1.36 | 1.31 | 1.01 | 16.11 | 13.72 | 10.39 | 128 | 138 | 141 |
| Styrene-acrylate Tackifier (Formulation I) | 10 | 10.88 | 9.09 | 2.11 | 2.25 | 2.2 | 16.75 | 18.17 | 16.58 | 69 | 99 | 100 |
| Styrene-acrylate Tackifier (Formulation II) | 19.76 | 14.75 | 11.75 | 2.64 | 2.67 | 2.59 | 16.23 | 18.95 | 16.96 | 46 | 68 | 78 |

The results clearly indicate that increasing the UV-dose upon the acResin® 258 acrylic copolymer decreased peel adhesion to steel and PE, decreased loop tack to steel, and increased SAFT. When using a tackifier resin with the acrylic copolymer to produce the inventive UV-curable adhesive composition, an increase in UV-dose also tended to decrease the peel adhesion to steel, but the peel remained significantly above the level of the acResin® 258 acrylic copolymer alone.

Another advantage was the loop tack is hardly effected by the UV-dose when using a tackifier resin while the loop tack of the UV-curable acrylic composition alone decreased. Loop tack even tended to increase initially using more UV-dose.

In all cases, SAFT increased upon more curing. The SAFT level with the inventive UV-curable adhesive composition was lower than the UV-curable acrylic composition alone, but the data in Table 10.1 show that with varying some of the tackifier resin properties like softening point and acid number, the SAFT can be increased while peel and loop tack values can be higher than the UV-curable acrylic composition alone.

The trends as found in FIGS. 14–17 were similar to those found in using the solvent coating method (see Table 10.1).

Example 14

Other Styrene-Acrylate Tackifier Resins Used in Hotmelts

Like in Table 10.1, several other styrene-acrylate tackifier resins were used with acResin® 258 UV acrylic copolymer to produce a UV-curable adhesive composition. These UV-curable adhesive compositions were then coated using the hotmelt coating method described previously.

TABLE 21

Application Results of Various Tackifier Resins
in acResin ® 258 Acrylic Copolymer (15:85) at a
Coating Weight of 30 g/m² and a UV-C Dose of 25 mJ/cm²

| | Peel Adhesion to Steel 1 min (N/25 mm) | Peel Adhesion to PE 10 min (N/25 mm) | Loop tack to steel (N/25 mm) | SAFT, 1 kg 0.5° C./ min (° C.) |
|---|---|---|---|---|
| No resin | 8.41 | 1.36 | 14.21 | 128 |
| Foral 85-E | 17.5 CF | 11.54 | 9.94 | 41 |
| Kristalex F100 | 14.89 LCF | 2.65 | 15.08 | 44 |
| Styrene-acrylate (Formulation I) | 10.31 | 2.11 | 18.22 | 69 |
| Styrene-acrylate (Formulation II) | 19.76 | 2.64 | 16.23 | 45 |
| Reactol AC 11 | 14.81 LCF | 3.08 | 17.28 | 87 |
| Reactol AC 18 | 11.81 | 1.55 | 17.26 | 114 |
| Reactol OS 65 | 10.53 | 1.93 | 10.21 | 54 |

The data showed significant differences between the formulations. The use of Foral 85-E®rosin esters resulted in a very high peel adhesion to PE, while the use of the other tackifier resins were considerably lower, but still higher than the UV-curable acrylic composition alone. However, the use of Foral® 85-E rosin esters also gave a lower loop tack than the UV-curable acrylic compositions alone.

The use of the two Reactol® tackifier resins, AC 11 and AC 18, gave very good SAFT in combination with the other properties, despite the fact that both Reactol® tackifier resins are liquid products with no acid functionality. In case of Reactol® AC 18, the data can be explained by the fact that the product is incompatible with the acResin® acrylic copolymers. This is also the reason why there is only a small increase of peel adhesion to PE.

In case of Reactol® AC 11 tackifier resins, a different mechanism is probably the reason. In this case, the presence of hydroxyl functionality can have an influence. Reactol® AC 11 tackifier resins have good properties and with a small increase in UV-dose, SAFT can further increase (see also Table 19) while peel and loop tack can have high values too. Reactol® OS65 tackifier resin did not give a large increase in peel, loop tack or SAFT, but this tackifier resin had a significant effect on MVTR (see subsequent example).

So again, it is demonstrated that the styrene-acrylate chemistry can be used to produce tackifier resins for UV-curable adhesive compositions, while the variations in properties and functionality, which are possible using this chemistry, can be used to obtain the desirable balance between adhesion and cohesion.

Example 15

Moisture Vapor Transfer Rate and Fogging Tests

Two other advantages of the use of styrene-acrylate tackifier resins compared to conventional tackifiers, such as, Foral® 85-E rosin esters and Kristalex® F100 aromatic resin, is that styrene-acrylate tackifiers can give better results in fogging tests. Films prepared with an 18:85 ratio of tackifier resin to UV-curable acrylic composition were evaluated. The same films as used for the adhesive evaluation were used for MVTR and Fogging. In case of MVTR, the films were transferred to a highly breathable kimwipe structure, and the values was corrected by assuming that the resistances (1/MVTR) were additive. Results are given in Table 22.

TABLE 22

MVTR Results and Fogging Results of
Various Tackifier Resins in acResin ® 258 Acrylic Copolymer (15:85)
at a Coating Weight of 30 g/m² and a UV-C Dose of 25 and 50 mJ/cm²

|  | MVTR | Fogging |
|---|---|---|
| Curing dose | 25 | 25 |
| No resin | 971 | 96.5 |
| Foral 85-E | 696 | 81 |
| Kristalex F100 | 769 | 83 |
| Styrene-acrylate Tackifier (Formulation I) | 790 | 95.4 |
| Styrene-acrylate Tackifier (Formulation II) | 843 | 96.5 |
| Reactol AC 11 | 1035 | 78.3 |
| Reactol AC 18 | 698 | 88.5 |
| Reactol OS 65 | 2478 | 90.7 |

Only insignificant decreased of the MVTR was observed for the styrene-acrylate tackifier resins compared to the acResin® acrylic copolymer alone. In case of Reactol® AC 11 acrylic resin and Reactol® OS 65 acrylic resin, even a significant increase was observed. In case of Reactol® OS 65 acrylic resin, the MVTR was even twice as high as for the other films so this indicates that the styrene-acrylate chemistry can be modified to effect MVTR in a controlled way.

The fogging data at 25 mL/cm² clearly showed that the results for styrene-acrylate tackifiers of Formulation I and II were much better than for conventional tackifiers such as Foral® 85-E rosin esters and Kristalex® aromatic resin. Foral® 85-E rosin esters and Kristalex® aromatic resins increased fogging while the use of the inventive styrene-acrylate tackifier resins produced in Example 1 hardly showed any differences in fogging compared to the acResin® 258 acrylic copolymer alone. The Reactol® tackifier resins also tended to increase fogging, which again showed the effect of the residual monomer removal. In case of the styrene-acrylate tackifier resin of Formulation I, almost no increase was observed.

That which is claimed is:

1. A radiation-curable adhesive composition comprising at least one tackifier resin and at least one radiation-curable composition wherein said tackifier resin comprises monomer repeating units from at least one aromatic monomer and at least one acrylate monomer; wherein said radiation-curable composition can be cured by exposure to radiation, wherein said tackifier resin has a residual monomer concentration of less than about 600 ppm by weight based on the weight of said tackifier resin.

2. A radiation-curable adhesive composition according to claim 1 wherein said aromatic monomer is at least one selected from the group consisting of olefinic substituted aromatics.

3. A radiation-curable adhesive composition according to claim 2 wherein said aromatic monomer is selected from the group consisting of styrene, alpha-methyl styrene, vinyl toluene, indene, methylindenes, divinylbenzene, dicyclopentadiene, and methyl-dicyclopentadiene.

4. A radiation-curable adhesive composition according to claim 1 wherein said acrylate monomer has the general formula:

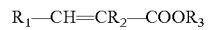

$R_1$—CH=$CR_2$—$COOR_3$ wherein $R_1$ is selected from the group consisting of hydrogen, aliphatic groups, and aromatic groups; wherein $R_2$ is selected from the group consisting of hydrogen, aliphatic groups, and aromatic groups; and wherein $R_3$ is selected from the group consisting of hydrogen, aliphatic groups, aromatic groups.

5. A radiation-curable adhesive composition according to claim 4 wherein said aliphatic group has 1 to about 20 carbon atoms.

6. A radiation-curable adhesive composition according to claim 5 wherein said aliphatic group has 1 to 12 carbon atoms.

7. A radiation-curable adhesive composition according to claim 5 wherein said aromatic group has about 6 to about 20 carbon atoms.

8. A radiation-curable adhesive composition according to claim 5 wherein both $R_1$ and $R_2$ of the acrylate monomer is hydrogen.

9. A radiation-curable adhesive composition according to claim 1 wherein said acrylate monomer is selected from the group consisting of methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl (meth)acrylate, octyl acrylate, octyl methacrylate, isooctyl (meth)acrylate, n-nonyl(meth)acrylate, iso-nonyl(meth) acrylate, decyl(meth)acrylate, isodecyl acrylate, isodecyl methacrylate, dodecyl(meth)acrylate, isobornyl(meth)acrylate, lauryl methacrylate, lauryl acrylate, tridecyl acrylate, tridecyl methacrylate, stearyl acrylate, stearyl methacrylate, glycidyl methacrylate, acetoacetoxyethyl methacrylate, acetoacetoxyethyl acrylate, acetoacetoxypropyl methacrylate, acetoacetoxypropyl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy) ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400)acrylate, polypropyleneglycol(400)methacrylate, benzyl acrylate, benzyl methacrylate, acrylonitrile, and mixtures thereof.

10. A radiation-curable adhesive composition according to claim 1 wherein said acrylate monomer has up to about 20 carbon atoms.

11. A radiation-curable adhesive composition according to claim 10 wherein said acrylate monomer is selected from the group consisting of acrylic acid, 2-ethylhexyl acrylate, methyl methacrylate, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl (meth)acrylate, octyl acrylate, octyl methacrylate, isooctyl (meth)acrylate, n-nonyl(meth)acrylate, iso-nonyl(meth) acrylate, decyl(meth)acrylate, isodecyl acrylate, isodecyl methacrylate, dodecyl(meth)acrylate, isobornyl(meth)acrylate, hydroxyethyl methacrylate, hydroxyethyl acrylate, allyl methacrylate, cyclohexyl methacrylate, cyclohexyl acrylate, n-hexyl acrylate, n-hexyl methacrylate, isobornyl acrylate, isobornyl methacrylate, and mixtures thereof.

12. A radiation-curable adhesive composition according to claim 11 wherein said acrylate monomer is acrylic acid and 2-ethylhexyl acrylate.

13. A radiation-curable adhesive composition according to claim 1 wherein said acrylate monomer contains at least one functional group selected from the group consisting of hydroxy, cycloaliphatic, acid, epoxide, amide, acrylonitril and acrylate groups.

14. A radiation-curable adhesive composition according to claim 1 wherein said tackifier resin is produced by a radical catalyzed polymerization process utilizing at least one initiator.

15. A radiation-curable adhesive composition according to claim 14 wherein said initiator is selected from the group consisting of diacyl peroxides, dialkyl peroxidicarbonates, tert-alkyl peroxyesters, di-tert-alkyl peroxides, tert-alkyl hydroperoxides, ketone peroxides, and mixtures thereof.

16. A radiation-curable adhesive composition according to claim 1 wherein said tackifier resin is produced by a process comprising contacting a tackifier resin product stream with at least one carrier at a temperature sufficient to remove a portion of the residual monomers.

17. A radiation-curable adhesive composition according to claim 1 wherein said tackifier resin does not significantly decrease the moisture vapor transport rate of said radiation-curable adhesive composition.

18. A radiation-curable adhesive composition according to claim 17 wherein said tackifier resin does not decrease the moisture vapor transport rate of said radiation-curable adhesive composition by more than 25%.

19. A radiation-curable adhesive composition according to claim 1 wherein the moisture vapor transport rate of said radiation-curable adhesive composition is the same or increased over said radiation-curable composition alone.

20. A radiation-curable adhesive composition according to claim 1 wherein the moisture vapor transport rate of said radiation-curable adhesive composition ranges from about 200 to about 3000.

21. A radiation-curable adhesive composition according to claim 20 wherein the moisture vapor transport rate of said radiation-curable adhesive composition ranges from about 500 to 1500.

22. A radiation-curable adhesive composition according to claim 1 wherein said residual monomer concentration of said tackifier resin is less than about 300 ppm by weight based on the weight of said tackifier resin.

23. A radiation-curable adhesive composition according to claim 1 wherein said residual monomer concentration of said tackifier resin is less than about 200 ppm aromatic monomer based on the weight of said tackifier resin and less than about 400 ppm acrylic monomer.

24. A radiation-curable adhesive composition according to claim 23 wherein said residual monomer concentration of said tackifier resin is less than about 100 ppm by weight aromatic monomer and less than about 150 ppm by weight acrylic monomer.

25. A radiation-curable adhesive composition according to claim 1 wherein said tackifier resin has a residual solvent level less than about 500 ppm by weight based on the weight of said tackifier resin.

26. A radiation-curable adhesive composition according to claim 1 wherein the amount of aromatic monomer repeating units in the tackifier resin ranges from about 20% to about 70% based on the total amount of monomer repeating units in the tackifier resin.

27. A radiation-curable adhesive composition according to claim 1 wherein the amount of acrylate monomer repeating units in said tackifier resin ranges from about 30% to about 80% based on the total amount of monomer repeating units in the tackifier resin.

28. A radiation-curable adhesive composition according to claim 1 wherein said tackifier resin has a R&B softening point ranging from being a liquid at room temperature to about 180° C.

29. A radiation-curable adhesive composition according to claim 1 wherein said acid number of said tackifier resin ranges from about 0 to about 300 mg KOH/g resin.

30. A radiation-curable adhesive composition according to claim 1 wherein said hydroxyl number of said tackifier resin ranges from about 0 to about 300.

31. A radiation-curable adhesive composition according to claim 1 wherein the MMAP cloud point of said tackifier resin is less than 50° C.

32. A radiation-curable adhesive composition according to claim 1 wherein the number average molecular weight (Mn) of said tackifier resin ranges from about 1,500 to about 7,000 daltons.

33. A radiation-curable adhesive composition according to claim 1 wherein the number average molecular weight (Mn) of said tackifier resin ranges from 2,000 to 4,000 daltons.

34. A radiation-curable adhesive composition according to claim 1 wherein the weight average molecular weight (Mw) of the tackifier resin ranges from about 2,000 to about 25,000 daltons.

35. A radiation-curable adhesive composition according to claim 1 wherein the weight average molecular weight (Mw) of the tackifier resin ranges from 3,000 to 10,000.

36. A radiation-curable adhesive composition according to claim 1 wherein the z-average molecular weight (Mz) of said tackifier resin ranges from about 3,000 to about 75,000 daltons.

37. A radiation-curable adhesive composition according to claim 1 wherein the z-average molecular weight (Mz) of said tackifier resin ranges from 5000 to 20000.

38. A radiation-curable adhesive composition according to claim 1 wherein the Gardner color of said tackifier resin is less than 5.

39. A radiation-curable adhesive composition according to claim 1 wherein said tackifier resin has an aromaticity of 45% or higher and an acid number of 100 mg KOH/g resin or lower.

40. A radiation-curable adhesive composition according to claim 1 wherein said tackifier resin has a softening point of 80° C. or higher.

41. A radiation-curable adhesive composition according to claim 1 wherein said tackifier resin comprises repeating units from at least one monomer selected from the group consisting of styrene, acrylic acid, and 2-ethylhexyl acrylate.

42. A radiation-curable adhesive composition according to claim 41 wherein the amount of styrene repeating units ranges from 0 to 100% based on the total amount of monomer repeating units in the tackifier resin.

43. A radiation-curable adhesive composition according to claim 42 wherein the amount of acrylic acid and 2-ethylhexyl acrylate ranges from 0–100% based on the total amount of monomer repeating units in the tackifier resin.

44. A radiation-curable adhesive composition according to claim 41 wherein said tackifier resin comprises repeating units of styrene and repeating units of acrylic acid and/or 2-ethylhexyl acrylate, and wherein the amount of styrene repeating units ranges from about 20% to about 70% based on the total amount of monomer repeating units in said tackifier resin, and the combined amount of acrylic acid repeating units, if present, and 2-ethylhexyl acrylate repeating units, if present, ranges from about 30% to about 80%.

45. A radiation-curable adhesive composition according to claim 1 wherein said radiation-curable composition is at least one selected from the group consisting of acrylic compositions, epoxides, urethanes, hybrid compositions, isoprene compositions, and styrene block copolymers.

46. A radiation-curable adhesive composition according to claim 45 wherein said acrylic compositions are selected from acrylic monomers, acrylic oligomers, and acrylic polymers.

47. A radiation-curable adhesive composition according to claim 46 wherein said acrylic monomer is at least one selected from the group consisting of acrylic acid, 2-ethylhexyl acrylate, methyl methacrylate, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl(meth)acrylate, hydroxyethyl; methacrylate, hydroxyethyl acrylate, allyl methacrylate, cyclohexyl methacrylate, cyclohexyl acrylate, n-hexyl acrylate, n-hexyl methacrylate, isobornyl acrylate, isobornyl methacrylate, and mixtures thereof.

48. A radiation-curable adhesive composition according to claim 46 wherein said acrylic oligomers comprise at least one repeating unit selected from the group consisting of acrylic acid, 2-ethylhexyl acrylate, methyl methacrylate, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl(meth)acrylate, hydroxyethyl methacrylate, hydroxyethyl acrylate, allyl methacrylate, cyclohexyl methacrylate, cyclohexyl acrylate, n-hexyl acrylate, n-hexyl methacrylate, isobornyl acrylate, isobornyl methacrylate, and mixtures thereof.

49. A radiation-curable adhesive composition according to claim 46 wherein said acrylic polymers include both homopolymers, copolymers, and terpolymers produced from at least one monomer selected from the group consisting of methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl(meth)acrylate, lauryl methacrylate, lauryl acrylate, tridecyl acrylate, tridecyl methacrylate, stearyl acrylate, stearyl methacrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetoxypropyl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy)ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400)acrylate, polypropyleneglycol(400)methacrylate, benzyl acrylate, benzyl methacrylate, sodium 1-allyloxy-2-hydroylpropyl sulfonate, acrylonitrile, and mixtures thereof.

50. A radiation-curable adhesive composition according to claim 46 wherein said acrylic polymers comprise repeating units from acrylic monomers and at least one polar copolymerizable monomers.

51. A radiation-curable adhesive composition according to claim 50 wherein said polar copolymerizable monomer is at least one selected from the group consisting of cyanoalkyl acrylates, acrylamides, substituted acrylamides, N-vinyl pyrrolidone, N-vinyl caprolactam, acrylonitrile, vinyl chloride, vinylidene chloride, diallyl phthalate, and mixtures thereof.

52. A radiation-curable adhesive composition according to claim 1 wherein said radiation-curable acrylic polymers are selected from the group consisting of acrylic copolymers, acrylated polyethers, acrylated polyester-based polyurethanes, methacrylated polyesters, and acrylated epoxies.

53. A radiation-curable adhesive composition according to claim 52 wherein said radiation-curable acrylic polymer is a ultraviolet light reactive, solvent free acrylic copolymer with a Tg of less than or equal to about −32° C. or lower and a viscosity of less than or equal to about 24000 mPa·s at 120° C.

54. A radiation-curable adhesive composition according to claim 1 wherein the amounts of said tackifier resin ranges from about 0.1% to about 50% based on the weight of the radiation-curable adhesive composition.

55. A radiation-curable adhesive composition according to claim 54 wherein the amounts of tackifier resin ranges from 0.1% to 25% based on the weight of the radiation-curable adhesive composition.

56. A radiation-curable adhesive composition according to claim 1 further comprising at least one photo-initiator.

57. A radiation-curable adhesive composition according to claim 1 further comprising at least one crosslinking agent.

58. A radiation-curable adhesive composition according to claim 1 further comprising at least one additive selected the group consisting of from reinforcing agents, fire retardants, foaming agents, conventional tackifiers, plasticizers, oils, antioxidants, polymers, curable/reactive monomers, crosslinking agents, fillers, and pigments.

59. A process of making a radiation-curable adhesive composition, said process comprising providing at least one tackifier resin and at least one radiation-curable composition wherein said tackifier resin comprises monomer repeating units from at least one aromatic monomer and at least one acrylate monomer, wherein said tackifier resin has a residual monomer concentration of less than about 600 ppm by weight based on the weight of said tackifier resin.

60. An article comprising said radiation-curable adhesive composition of claim 1.

* * * * *